(12) United States Patent
John Wilson et al.

(10) Patent No.: US 11,510,193 B2
(45) Date of Patent: Nov. 22, 2022

(54) TECHNIQUES FOR ESTABLISHING A BEAM PAIR LINK

(71) Applicant: QUALCOMM Incorporated, San Diego, CA (US)

(72) Inventors: Makesh Pravin John Wilson, San Diego, CA (US); Tao Luo, San Diego, CA (US); Xiao Feng Wang, San Diego, CA (US); Sony Akkarakaran, Poway, CA (US); Sumeeth Nagaraja, San Diego, CA (US); Yan Zhou, San Diego, CA (US); Shengbo Chen, San Diego, CA (US); Juan Montojo, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/128,355

(22) Filed: Sep. 11, 2018

(65) Prior Publication Data

US 2019/0082438 A1    Mar. 14, 2019

Related U.S. Application Data

(60) Provisional application No. 62/558,187, filed on Sep. 13, 2017.

(51) Int. Cl.
*H04W 72/04* (2009.01)
*H04L 5/00* (2006.01)
(Continued)

(52) U.S. Cl.
CPC ........ *H04W 72/0446* (2013.01); *H04B 7/024* (2013.01); *H04B 7/0408* (2013.01);
(Continued)

(58) Field of Classification Search
CPC .......... H04W 72/0446; H04W 72/042; H04W 72/085; H04W 56/001; H04L 5/0032; H04B 7/0408
See application file for complete search history.

(56) References Cited

U.S. PATENT DOCUMENTS

| 6,947,759 B1 | 9/2005 | Yamaguchi et al. |
| 8,213,994 B2 | 7/2012 | Cave et al. |

(Continued)

FOREIGN PATENT DOCUMENTS

| EP | 3370380 A1 | 9/2018 |
| JP | 2013236278 A | 11/2013 |

(Continued)

OTHER PUBLICATIONS

International Search Report and Written Opinion—PCT/US2018/050719—ISA/EPO—dated Nov. 26, 2018.
Taiwan Search Report—TW107132038—TIPO—dated Feb. 15, 2022.

*Primary Examiner* — Rasheed Gidado
(74) *Attorney, Agent, or Firm* — Holland & Hart, LLP

(57) ABSTRACT

Techniques are described herein for beam pair link procedures used in dual connectivity operations. A master base station may be configured to determine a timing window for a user equipment (UE) to monitor a downlink channel associated with a secondary base station. In some cases, the master base station may determine the timing window during a dual connectivity procedure or during a carrier aggregation procedure. The UE may monitor the downlink channel during the timing window and establish a beam pair link with the secondary base station based on the monitoring.

24 Claims, 15 Drawing Sheets

(51) Int. Cl.
*H04W 72/08* (2009.01)
*H04W 56/00* (2009.01)
*H04B 7/0408* (2017.01)
*H04B 7/024* (2017.01)
*H04B 7/08* (2006.01)
*H04B 7/06* (2006.01)
*H04W 72/12* (2009.01)
*H04W 76/15* (2018.01)
*H04W 74/00* (2009.01)
*H04W 24/10* (2009.01)

(52) U.S. Cl.
CPC ........... *H04B 7/0695* (2013.01); *H04B 7/088* (2013.01); *H04L 5/0032* (2013.01); *H04L 5/0035* (2013.01); *H04L 5/0048* (2013.01); *H04W 56/001* (2013.01); *H04W 72/042* (2013.01); *H04L 5/001* (2013.01); *H04W 24/10* (2013.01); *H04W 72/085* (2013.01); *H04W 72/1284* (2013.01); *H04W 74/002* (2013.01); *H04W 76/15* (2018.02)

(56) References Cited

U.S. PATENT DOCUMENTS

| | | | |
|---|---|---|---|
| 9,306,657 B2 | 4/2016 | De La Chapelle et al. | |
| 9,621,248 B2 | 4/2017 | Maltsev et al. | |
| 9,750,061 B2 | 8/2017 | Subasic et al. | |
| 10,257,738 B2* | 4/2019 | Wiberg | H04B 7/0695 |
| 10,477,591 B2* | 11/2019 | Jung | H04W 74/0833 |
| 10,506,618 B2* | 12/2019 | Murphy | H04W 48/18 |
| 10,728,823 B2* | 7/2020 | Cheng | H04W 74/008 |
| 10,790,949 B2* | 9/2020 | Damnjanovic | H04W 52/38 |
| 10,904,881 B2* | 1/2021 | Tang | H04W 56/0005 |
| 2013/0301619 A1* | 11/2013 | Singh | H04W 56/0045 370/336 |
| 2015/0245307 A1* | 8/2015 | Chen | H04L 5/001 370/336 |
| 2015/0304868 A1* | 10/2015 | Yu | H04W 56/001 |
| 2016/0286449 A1* | 9/2016 | Choi | H04W 36/18 |
| 2016/0337916 A1* | 11/2016 | Deenoo | H04W 8/22 |
| 2016/0360463 A1* | 12/2016 | Kim | H04B 7/0617 |
| 2017/0331670 A1* | 11/2017 | Parkvall | H04J 11/0056 |
| 2017/0339662 A1* | 11/2017 | Lin | H04W 64/006 |
| 2018/0049055 A1* | 2/2018 | Wiberg | H04W 72/044 |
| 2018/0124724 A1* | 5/2018 | Tsai | H04W 56/00 |
| 2018/0132252 A1* | 5/2018 | Islam | H04B 7/0617 |
| 2018/0270775 A1* | 9/2018 | Zhang | H04L 27/2655 |
| 2018/0279284 A1* | 9/2018 | Wang | H04W 72/14 |
| 2018/0359790 A1* | 12/2018 | Ingale | H04W 28/16 |
| 2018/0367374 A1* | 12/2018 | Liu | H04W 76/18 |
| 2018/0375556 A1* | 12/2018 | Wang | H04B 7/061 |
| 2019/0052334 A1* | 2/2019 | Jeon | H04J 13/0062 |

FOREIGN PATENT DOCUMENTS

| | | |
|---|---|---|
| WO | WO-2017068432 A1 | 4/2017 |
| WO | WO-2017084607 A1 | 5/2017 |
| WO | WO-2017151876 A1 | 9/2017 |

\* cited by examiner

TECHNIQUES FOR ESTABLISHING A BEAM PAIR LINK

CROSS REFERENCES

The present application for patent claims the benefit of U.S. Provisional Patent Application No. 62/558,187 by JOHN WILSON et al., entitled "TECHNIQUES FOR ESTABLISHING A BEAM PAIR LINK," filed Sep. 13, 2017, assigned to the assignee hereof, and expressly incorporated by reference herein in its entirety.

BACKGROUND

The following relates generally to wireless communication, and more specifically to techniques for establishing a beam pair link.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems may use directional beams to establish communication links. In these wireless communication systems, beam pair links that include both a directional transmission beam and a directional reception beam may be established. In addition, these wireless communication systems may also support dual connectivity operations.

SUMMARY

The described techniques relate to improved methods, systems, devices, or apparatuses that support techniques for establishing a beam pair link. Generally, the described techniques provide for beam pair link procedures used in dual connectivity operations. A master base station may be configured to determine a timing window for a UE to monitor a downlink channel associated with a secondary base station. In some cases, the master base station may determine the timing window during a dual connectivity procedure or during a carrier aggregation procedure. The UE may monitor the downlink channel during the timing window and establish a beam pair link with the secondary base station based on the monitoring.

A method of wireless communication is described. The method may include receiving a time window message from a first base station indicating a time window for monitoring a downlink beam from a second base station and monitoring the downlink beam from the second base station during the time window based on receiving the time window message, where monitoring the downlink beam from the second base station is executed as part of a dual connectivity procedure.

An apparatus for wireless communication is described. The apparatus may include a processor, memory in electronic communication with the processor, and instructions stored in the memory. The instructions may be executable by the processor to cause the apparatus to receive a time window message from a first base station indicating a time window for monitoring a downlink beam from a second base station and monitor the downlink beam from the second base station during the time window based on receiving the time window message, where monitoring the downlink beam from the second base station is executed as part of a dual connectivity procedure.

Another apparatus for wireless communication is described. The apparatus may include means for receiving a time window message from a first base station indicating a time window for monitoring a downlink beam from a second base station and monitoring the downlink beam from the second base station during the time window based on receiving the time window message, where monitoring the downlink beam from the second base station is executed as part of a dual connectivity procedure.

A non-transitory computer-readable medium storing code for wireless communication is described. The code may include instructions executable by a processor to receive a time window message from a first base station indicating a time window for monitoring a downlink beam from a second base station and monitor the downlink beam from the second base station during the time window based on receiving the time window message, where monitoring the downlink beam from the second base station is executed as part of a dual connectivity procedure.

Some examples of the method, apparatuses, and non-transitory computer-readable medium described herein may further include operations, features, means, or instructions for receiving a measurement message from the first base station indicating a beam parameter of one or more beams to measure and transmitting a measurement report that includes the beam parameter based on receiving the measurement message, where receiving the time window message may be based on transmission of the measurement report.

Some examples of the method, apparatuses, and non-transitory computer-readable medium described herein may further include operations, features, means, or instructions for identifying, based on receiving the time window message, one or more slots to monitor for the downlink beam using a reception beam on which a synchronization signal block was received, where monitoring the downlink beam may be based on identifying the one or more slots.

Some examples of the method, apparatuses, and non-transitory computer-readable medium described herein may further include operations, features, means, or instructions for measuring the beam parameter of one or more beams based on receiving the measurement message, where transmitting the measurement report may be based on measuring the beam parameter.

Some examples of the method, apparatuses, and non-transitory computer-readable medium described herein may further include operations, features, means, or instructions for measuring the beam parameter for each of the one or more beams using a single reception beam based on receiving the measurement message and identifying a beam index of at least one beam of the one or more beams based on measuring the beam parameter for each of the one or more beams, where transmitting the measurement report may be based on identifying the beam index.

Some examples of the method, apparatuses, and non-transitory computer-readable medium described herein may further include operations, features, means, or instructions for transmitting a third message using a transmission beam based on monitoring the downlink beam.

In some examples of the method, apparatuses, and non-transitory computer-readable medium described herein, the third message may be a RACH message, a SRS, or a scheduling request (SR).

Some examples of the method, apparatuses, and non-transitory computer-readable medium described herein may further include operations, features, means, or instructions for establishing a beam pair link based on monitoring the downlink beam.

In some examples of the method, apparatuses, and non-transitory computer-readable medium described herein, the measurement message indicates the second base station with which to establish a dual connectivity communication link and the one or more beams may be associated with the second base station different from the first base station.

In some examples of the method, apparatuses, and non-transitory computer-readable medium described herein, the one or more beams may be synchronization signal beams associated with the second base station or channel state information reference signal (CSI-RS) beams associated with the second base station.

In some examples of the method, apparatuses, and non-transitory computer-readable medium described herein, the downlink beam may be a PDCCH beam.

In some examples of the method, apparatuses, and non-transitory computer-readable medium described herein, an UL transmission of the second base station may be based on the downlink beam.

In some examples of the method, apparatuses, and non-transitory computer-readable medium described herein, the measurement report includes a beam index, a received signal received power (RSRP) measurement, a received signal received quality (RSRQ) measurement, a received signal strength indicator (RSSI) measurement, a signal-to-interference-plus-noise ratio (SINR) measurement, or a combination thereof.

A method of wireless communication is described. The method may include transmitting a set of downlink beams in a set of directions, receiving an uplink message from a UE based on at least one of the transmitted downlink beams, determining a timing alignment with the UE based on receiving the uplink message, and establishing a beam pair link based on determining the timing alignment.

An apparatus for wireless communication is described. The apparatus may include a processor, memory in electronic communication with the processor, and instructions stored in the memory. The instructions may be executable by the processor to cause the apparatus to transmit a set of downlink beams in a set of directions, receive an uplink message from a UE based on at least one of the transmitted downlink beams, determine a timing alignment with the UE based on receiving the uplink message, and establish a beam pair link based on determining the timing alignment.

Another apparatus for wireless communication is described. The apparatus may include means for transmitting a set of downlink beams in a set of directions, receiving an uplink message from a UE based on at least one of the transmitted downlink beams, determining a timing alignment with the UE based on receiving the uplink message, and establishing a beam pair link based on determining the timing alignment.

A non-transitory computer-readable medium storing code for wireless communication is described. The code may include instructions executable by a processor to transmit a set of downlink beams in a set of directions, receive an uplink message from a UE based on at least one of the transmitted downlink beams, determine a timing alignment with the UE based on receiving the uplink message, and establish a beam pair link based on determining the timing alignment.

In some examples of the method, apparatuses, and non-transitory computer-readable medium described herein, the beam pair link may be established as part of a dual connectivity procedure.

In some examples of the method, apparatuses, and non-transitory computer-readable medium described herein, the uplink message may be a RACH message.

In some examples of the method, apparatuses, and non-transitory computer-readable medium described herein, the uplink message may be a scheduling request (SR).

Some examples of the method, apparatuses, and non-transitory computer-readable medium described herein may further include operations, features, means, or instructions for transmitting a set of synchronization signal beams, where receiving the uplink message may be based on transmitting the set of synchronization signal beams.

Some examples of the method, apparatuses, and non-transitory computer-readable medium described herein may further include operations, features, means, or instructions for receiving a measurement message from the first base station indicating a beam parameter of one or more beams to measure and transmit a measurement report that includes the beam parameter based on receiving the measurement message, where receiving the time window message may be based on transmission of the measurement report.

Some examples of the method, apparatuses, and non-transitory computer-readable medium described herein may further include operations, features, means, or instructions for identifying, based at least in part on receiving the time window message, one or more slots to monitor for the downlink beam using a reception beam on which a synchronization signal block was received, where monitoring the downlink beam may be based on identifying the one or more slots.

Some examples of the method, apparatuses, and non-transitory computer-readable medium described herein may further include operations, features, means, or instructions for measuring the beam parameter of one or more beams based on receiving the measurement message, where transmitting the measurement report may be based on measuring the beam parameter.

Some examples of the method, apparatuses, and non-transitory computer-readable medium described herein may further include operations, features, means, or instructions for measuring the beam parameter for each of the one or more beams using a single reception beam based on receiving the measurement message and identify a beam index of at least one beam of the one or more beams based on measuring the beam parameter for each of the one or more beams, where transmitting the measurement report may be based on identifying the beam index.

Some examples of the method, apparatuses, and non-transitory computer-readable medium described herein may further include operations, features, means, or instructions for transmitting a third message using a transmission beam based on monitoring the downlink beam.

In some examples of the method, apparatuses, and non-transitory computer-readable medium described herein, the third message may be a RACH message, a SRS, or a scheduling request (SR).

Some examples of the method, apparatuses, and non-transitory computer-readable medium described herein may further include operations, features, means, or instructions for establishing a beam pair link based on monitoring the downlink beam.

In some examples of the method, apparatuses, and non-transitory computer-readable medium described herein, the measurement message indicates the second base station with which to establish a dual connectivity communication link and the one or more beams may be associated with the second base station different from the first base station.

In some examples of the method, apparatuses, and non-transitory computer-readable medium described herein, the one or more beams may be synchronization signal beams associated with the second base station or channel state information reference signal (CSI-RS) beams associated with the second base station.

In some examples of the method, apparatuses, and non-transitory computer-readable medium described herein, the downlink beam may be a PDCCH beam.

In some examples of the method, apparatuses, and non-transitory computer-readable medium described herein, the measurement report includes a beam index, a received signal received power (RSRP) measurement, a received signal received quality (RSRQ) measurement, a received signal strength indicator (RSSI) measurement, a signal-to-interference-plus-noise ratio (SINR) measurement, or any combination thereof.

A method of wireless communication is described. The method may include a processor, memory in electronic communication with the processor, instructions stored in the memory and operable, when executed by the processor, to cause the apparatus to, receive an uplink message from a UE based on at least one of the transmitted downlink beams, determine a timing alignment with the UE based on receiving the uplink message, and establish a beam pair link based on determining the timing alignment.

An apparatus for wireless communication is described. The apparatus may include a processor, memory in electronic communication with the processor, and instructions stored in the memory. The instructions may be executable by the processor to cause the apparatus to receive an uplink message from a UE based on at least one of the transmitted downlink beams, determine a timing alignment with the UE based on receiving the uplink message, and establish a beam pair link based on determining the timing alignment.

Another apparatus for wireless communication is described. The apparatus may include means for a processor, memory in electronic communication with the processor, instructions stored in the memory and operable, when executed by the processor, to cause the apparatus to, receive an uplink message from a UE based on at least one of the transmitted downlink beams, determine a timing alignment with the UE based on receiving the uplink message, and establish a beam pair link based on determining the timing alignment.

A non-transitory computer-readable medium storing code for wireless communication is described. The code may include instructions executable by a processor to cause the apparatus to, receive an uplink message from a UE based on at least one of the transmitted downlink beams, determine a timing alignment with the UE based on receiving the uplink message, and establish a beam pair link based on determining the timing alignment.

DETAILED DESCRIPTION

Some wireless communication systems support both dual connectivity operations and communication links established using directional beams. When establishing a directional communication link with a primary second cell (PSCell) of a secondary cell group (SCG) in a dual connectivity procedure, the UE and a master base station of a primary cell (PCell) of the master cell group (MCG) may exchange information to facilitate establishing a beam pair link with the PSCell.

Techniques are described herein for beam pair link procedures used in dual connectivity operations. A master base station may be configured to determine a timing window for a UE to monitor a downlink channel associated with a secondary base station. In some cases, the master base station may determine the timing window during a dual connectivity procedure or during a carrier aggregation procedure. The UE may monitor the downlink channel during the timing window and establish a beam pair link with the secondary base station based on the monitoring.

Aspects of the disclosure are initially described in the context of a wireless communications system. Aspects of the disclosure are described in the context of a communication scheme that relate to techniques for establishing a beam pair link. Aspects of the disclosure are further illustrated by and described with reference to apparatus diagrams, system diagrams, and flowcharts that relate to techniques for establishing a beam pair link.

Figure 1:
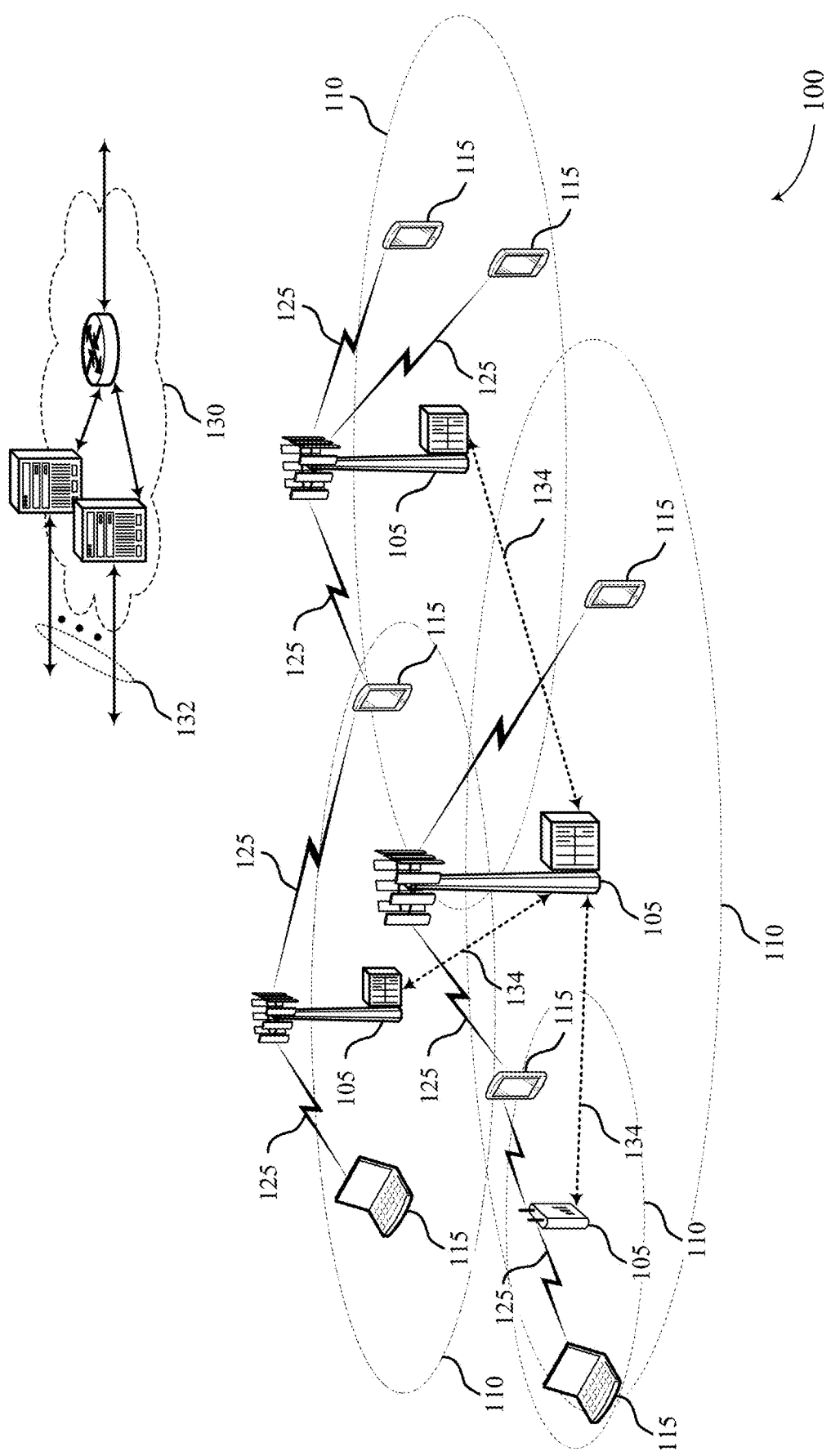
FIG. 1 illustrates an example of a system for wireless communication that supports techniques for establishing a beam pair link in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

While establishing a connection with a PSCell in a dual connectivity procedure, the UE 115 may monitor a downlink channel of a secondary base station during a timing window determined by a master base station associated with the PCell. The master base station may configure the timing window such that the beam pair linking procedures may take less time than if they were performed blindly by the UE 115 and the secondary base station. Such a timing window may improve resource efficiency of the wireless communication system 100.

Figure 2:
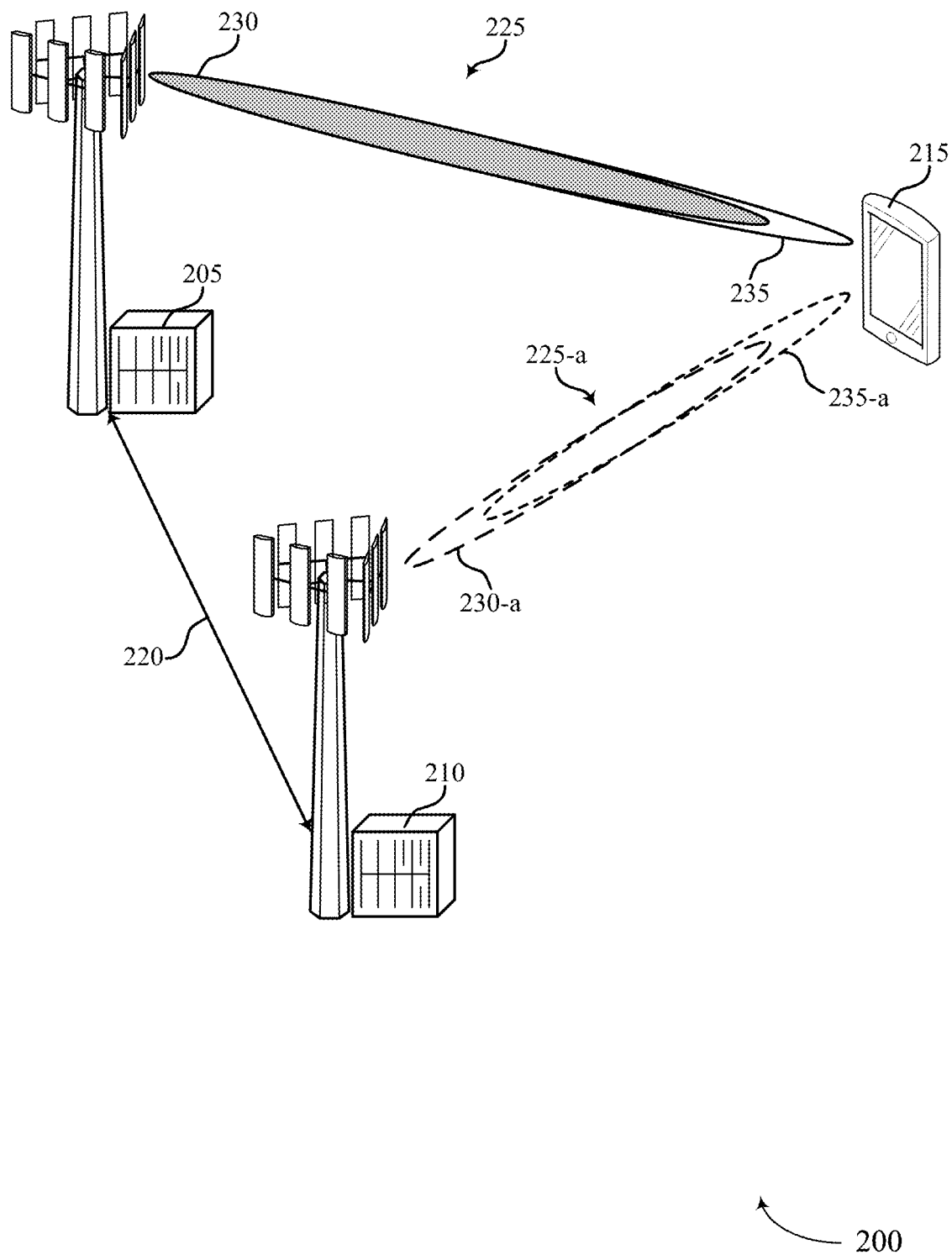
FIG. 2 illustrates an example of a wireless communication system that supports techniques for establishing a beam pair link in accordance with aspects of the present disclosure.

FIG. 2 illustrates an example of a wireless communication system 200 that supports techniques for establishing a beam pair link in accordance with various aspects of the present disclosure. In some examples, the wireless communication system 200 may implement aspects of wireless communication system 100.

The wireless communication system 200 may support dual connectivity operations that allow a UE 215 to utilize radio resources from multiple base station 205, 210 (or multiple cells) to improve the data throughput of the UE 215. For example, in dual connectivity, the UE 215 may establish communication links with both a master base station 205 and a secondary base station 210 and communicate data using both of those communication links. Dual connectivity may be used in scenarios where there is a non-ideal backhaul link 220 between the two base stations 205, 210. The base stations 205, 210 may be examples of base stations 105 described with reference to FIG. 1. The UE 215 may be an example of the UEs 115 described with reference to FIG. 1. The backhaul link 220 may be an example of the backhaul links 134 described with reference to FIG. 1.

In some cases, the communication links between the UE 215 and the respective base station 205, 210 may be established using a mmW radio access technology. As such, the communication link between the UE 215 and the master base station 205 may be an example of a beam pair link 225 that includes a directional transmission beam 230 and a directional reception beam 235. In a downlink context, the directional transmission beam 230 may be generated by the base station 205 and the directional reception beam 235 may be generated by the UE 215. In an uplink context, the directional transmission beam 230 may be generated by the UE 215 and the directional reception beam 235 may be generated by the base station 205.

Directional beams, such as beams 230 and 235, provide a communication link for a relatively limited area. To establish a bi-directional communication link, the communication link may include a directional transmission beam 230 that is properly targeted and a directional reception beam 235 that is properly targeted. Mobility by the UE 215 in the wireless network may cause one or both of the directional beams to become misaligned. If the misalignment of one or both of the beams becomes great enough, a radio link failure (RLF) event may occur. To address these issues, the wireless communication system 200 may support beam pair link pairing procedures to establish a bi-directional communication link using directional beams and beam refinement procedures to maintain beam pair links and avoid an RLF event.

Given the directional nature of mmW communication links, blind random access channel (RACH) procedures or beam pair link procedures may take more time than blind RACH procedures in omnidirectional wireless communication systems. For example, as part of a blind RACH procedure for mmW systems, a UE (e.g., UE 215) may listen for beams while a base station (base station 205 or 210) transmits a plurality of reference signals in a plurality of different direction, where only a subset of those transmitted reference signals will be received by the UE.

Techniques are described herein for beam pair link procedures used in dual connectivity operations in a mmW system. In some cases, the beam pair link procedures may take less time than blind beam pair link procedures in the mmW system. The beam pair link procedures described herein may be configured to use the beam pair link 225 between the master base station 205 and the UE 215 to establish a new beam pair link 225-a between the secondary base station 210 and the UE 215. In some cases, aspects of these beam pair link procedures may be used in carrier aggregation operations as well.

Figure 3:
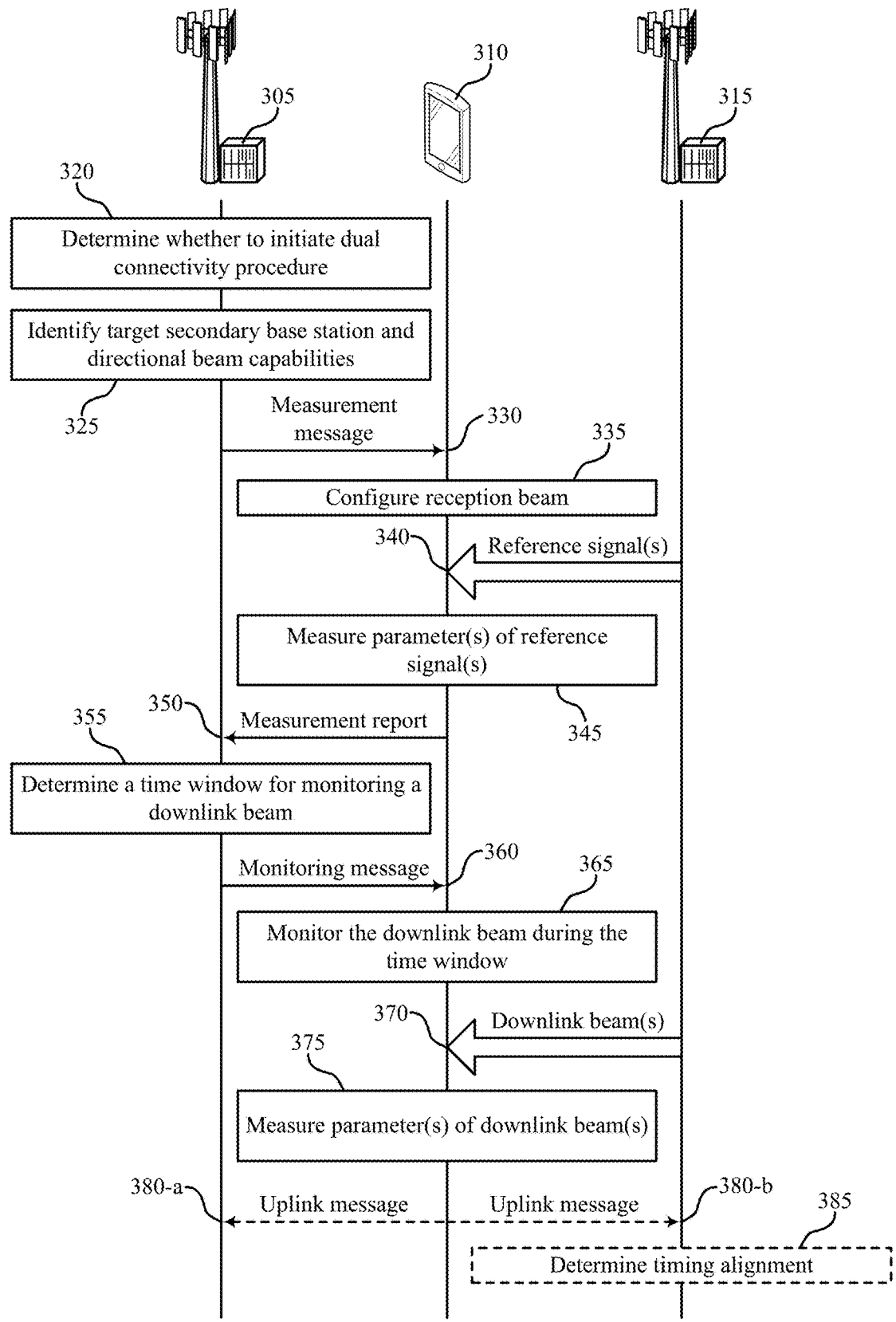
FIG. 3 illustrates an example of a communication scheme that supports techniques for establishing a beam pair link in accordance with aspects of the present disclosure.

FIG. 3 illustrates an example of a communication scheme 300 that supports techniques for establishing a beam pair link in accordance with various aspects of the present disclosure. In some examples, the communication scheme 300 may implement aspects of wireless communication systems 100 and 200.

The communication scheme 300 may illustrate beam pair link procedures that may occur in a dual connectivity context or a carrier aggregation context. The communication scheme 300 includes functions performed by and communications exchanged between various combinations of a master base station 305, a secondary base station 310, and a UE 315. The master base station 305 may be an example of base stations 105, 205 described with reference to FIGS. 1-2. The secondary base station 310 may be an example of base stations 105, 210 described with reference to FIGS. 1-2. The UE may be an example of UEs 115, 215 described with reference to FIGS. 1-2. In some cases, the functions of the master base station 305 may be performed by a primary cell (PCell) of a master cell group (MCG) corresponding to the master base station 305.

At block 320, the master base station 305 may determine whether to initiate a dual connectivity procedure or a carrier aggregation procedure for the UE 315 that is already connected to the master base station 305. Dual connectivity allows the UE 315 to receive data simultaneously from different base stations (e.g., the master base station 305 and the secondary base station 310) in order to boost the data throughput in a heterogeneous network with dedicated carrier deployment. Carrier aggregation allows the UE 315 to combine a number of separate LTE carriers on the same base station (e.g., the master base station 305) in order to boost data throughput and to use fragmented spectrum allocations. The master base station 305 may consider whether any cell or base station surrounding the UE 315 has unused network capacity.

At block 325, the master base station 305 may identify the secondary base station 310 as a target for a dual connectivity procedure with the UE 315. In addition, the master base station 305 may identify whether the secondary base station 310 and the UE 315 are going to establish a communication link using directional beams in a mmW system. If so, the master base station 305 may initiate one or more beam pair link procedures in conjunction with the dual connectivity procedures. To identify the secondary base station 310, the master base station 305 and one or more potential target secondary base stations (including secondary base station 310) may exchange messages using one or more backhaul links (e.g., backhaul links 134, 220). The messages may indicate network resources that are available to be used in a dual connectivity or carrier aggregation context. In some cases, the master base station 305 may identify a primary secondary cell (PSCell) of a secondary cell group (SCG) for establishing a dual connectivity link using a mmW system and/or directional beams.

The master base station 305 may generate and transmit a measurement message 330 to the UE 315 based on initiating a dual connectivity procedure between the UE 315 and the secondary base station 310. In some cases, the measurement message 330 may be transmitted based on the secondary base station 310 and the UE 315 being capable of establishing a beam pair link using a mmW system. In some cases, the measurement message 330 may include information about initiating a dual connectivity procedure and information related to establishing a beam pair link using a mmW system.

The measurement message 330 may include a request for a measurement report of signals transmitted by the secondary base station 310. For example, the measurement message 330 may indicate that the UE 315 should measure synchronization signal (SS) beams transmitted by the secondary base station 310 or channel state information reference signal (CSI-RS) beams transmitted by the secondary base station 310. The measurement message 330 may indicate one or more beam parameters of one or more beams that are to be measured by the UE 315. The one or more beams identified by the measurement message 330 may be a block of SS beams or a block of CSI-RS beams or a combination thereof. In some cases, the measurement message 330 may indicate an identify of the secondary base station 310 that transmits the one or more beams. In some cases, the measurement message 330 may indicate a timing for listening to the one or more beams of the secondary base station 210. Such timing may be based on information exchanged between the master base station 205 and the secondary base station 210 using a backhaul link.

The one or more beam parameters indicated by the measurement message 330 may include a received signal strength indicator (RSSI) of a received beam, a reference signal received power (RSRP) of a received beam, a reference signal received quality (RSRQ) of a received beam, a signal-to-interference plus noise ratio (SINR) of a received beam, or a combination thereof. In some cases, the measurement message 330 may be communicated using a downlink control channel or message a radio resource control (RCC) message or a combination thereof.

In some cases, the measurement message 330 may include one or more reception beam parameters to be used by the UE 315 to establish a reception beam to listen for the one or more beams. The one or more reception beam parameters may include beam width, beam target, beam direction, time domain resources of the reception beam, frequency resources of the reception beam, or a combination thereof.

At block 335, the UE 315 may configure a directional reception beam based on receiving the measurement message 330. The UE 315 may configure a beam width, a beam direction, frequency resources, time-based resources, or a combination thereof based on receiving the measurement message 330. In some cases, the reception beam may be configured based on information included in the measurement message 330 (e.g., specific parameters, identifier of target secondary base station, etc.). In some cases, the reception beam may be configured based on predetermined parameters. In some cases, the reception beam may be configured based on a combination of information in the measurement message 330 and predetermined parameters.

In some cases, the UE 315 may receive signals using an omnidirectional listening scheme rather than a directional reception beam.

The secondary base station 310 may transmit one or more reference signals or a block of reference signals. These reference signals may be transmitted periodically as part of normal operation, including operations that facilitate establishing communication links with other network entities.

The secondary base station 310 may transmit the one or more reference signals in blocks. A block may include transmitting at least one reference signal beam in every beam direction defined by a set of beam directions. In some cases, the block of reference signal beams may be transmitted according to a beam transmission pattern. In some cases, the secondary base station 310 may communicate timing information about the block of reference signal beams to the master base station 305 to facilitate beam pair link setup during a dual connectivity procedure. In some cases, the reference signal beams may be examples of SS beams, CSI-RS beams, or a combination thereof.

At block 345, the UE 315 may measure one or more parameters of the received reference signals. In some cases, the UE 315 may identify a beam index of one or more received reference beams based on the measured parameters. For example, the UE 315 may identify which received reference signal has the highest signal quality from the set of received reference signals. The UE 315 may provide the beam index of that identified reference signal to the master base station 305. In some cases, the UE 315 may determine that multiple transmission beams (e.g., reference signal beams) may be received using a single reception beam. In some cases, the UE 315 may measure beam parameters of the one or more reference signal beams using a single reception beam. In this manner, measurements between the different beams may be compared more easily.

The UE 315 may generate and transmit a measurement report 350 to the master base station 305 based on measuring the one or more parameters of the one or more reference signal beams. The measurement report 350 may include the parameters measured by the UE 315. The measurement report 350 may include a beam index of one or more beams selected by the UE 315. In some cases, the measurement report 350 may include a UE beam index that pairs with a transmission beam of the secondary base station 310. In some cases, the measurement report 350 may be an example of a beam specific measurement report. The measurement report 350 may be a control message, a RRC message, or a combination thereof.

At block 355, the master base station 305 may determine a time window for monitoring a downlink beam of the secondary base station 310 based on receiving the measurement report 350. The master base station 305 may use the measured parameters to assist the UE 315 in establishing a communication link using beam pairs in a mmW system. The time window may indicate time-based resources that the UE 315 should listen for one or more downlink beams transmitted by the secondary base station 310. In some cases, the time window may indicate a set of resources (e.g., slots, subframes, frames, etc.) to be monitored by the UE 315. In some cases, the time window may indicate a time duration for monitoring certain frequencies by the UE 315. The master base station 305 may configure the time window as part of a dual connectivity procedure where the UE 315 establishes a beam pair link with a secondary base station 310.

The master base station 305 may generate and transmit a monitoring message 360 to the UE 315 based on determining the time window. The monitoring message 360 may indicate the time window for monitoring for one or more downlink beams transmitted by the secondary base station 310. In some cases, the monitoring message 360 may include other information regarding the dual connectivity procedures or the beam pair linking procedures occurring as part of the dual connectivity procedures. The monitoring message 360 may be an example of a control message, a RRC message, or a combination thereof. In some cases, the monitoring message 360 may include other configuration data such search spaces.

At block 365, the UE 315 may monitor for the downlink beam during the time window based on receiving the monitoring message 360. Upon receiving the monitoring message 360, the UE 315 may decode the monitoring message 360 and determine the time window configured by the master base station 305. The UE 315 may configure a reception beam based on receiving the monitoring message 360 or on information included in the monitoring message 360.

The UE 315 may identify communication resources to monitor for a downlink beam from the secondary base station 310. In some cases, the UE 315 may identify one or more slots to monitor for the downlink beam using a reception beam corresponding to a synchronization signal block beam (for example, the same beam on which the synchronization signal block was received). For example, the UE 315 may monitor a downlink channel (e.g., physical downlink control channel (PDCCH)) of the secondary base station 310 using a reception beam that corresponds to a first SS block (e.g., SS block 4) during the first five slots of a frame and monitor the downlink channel using a reception beam that corresponds to a second SS block (e.g., SS block 8) during slots six through ten of the frame.

In some cases, the UE 315 may configure a reception beam based on receiving the monitoring message 360 (e.g., a preconfigured beam), information in the monitoring message (360) (e.g., dynamic beam), or a combination thereof. The reception beam may be configured to listen for one or more downlink beams 370 during the time window specified in the monitoring message 360.

The secondary base station 310 may transmit the one or more downlink beams 370. In some cases, the downlink beams 370 may be transmitted in blocks. A block may include transmitting at least one downlink beam 370 in every beam direction defined by a set of beam directions. In some cases, the block of downlink beams may be transmitted according to a beam transmission pattern. In some cases, the downlink beams 370 may be a transmission beam transmitted on PDCCH. Additionally, UL transmissions from the second base station may be based on the DL beam or multiple DL beams. In some cases, the DL beam may be a PDCCH scheduling a PDSCH, and the UL beam for the PUCCH ACK may be based on the DL beam or beams, assuming beam correspondence at the UE.

At block 375, the UE 315 may measure one or more parameters of one or more downlink beams 370 received by the UE 315. In some cases, the UE 315 may identify which downlink beam of the received downlink beams has the best channel parameters. Upon identifying one or more downlink beams 370 from the set of received downlink beams, the UE 315 may identify one or more characteristics of the identified beams.

In some cases, the UE 315 may transmit an uplink message 380-*b* to the secondary base station 310 based on measuring the parameters of the downlink beams 370. The uplink message 380-*b* may be transmitted using a transmission beam that includes beam parameters determined based on the one or more downlink beams 370 identified by the UE 315. For example, the UE 315 may identify one beam from the downlink beams with which to establish a beam pair link with the secondary base station 310 (or the PSCell in the dual connectivity context). In such examples, the UE 315 may use generate the transmission beam for the uplink message based on the downlink beams 370 received earlier. In some cases, the uplink message 380-*b* may be an example of a RACH message. In some cases, the uplink message 380-*b* may be an example of a response confirmation to a PDCCH order. In some cases, uplink message 380-*b* may be an example of a scheduling request. In some cases, the uplink message 380-*b* may be an example of a sounding reference signal. The uplink message 380-*b* may be communicated as a RRC message, a MAC control element (CE), a downlink control information (DCI) message, or a combination thereof. In some cases, the UE 315 may transmit the uplink message 380-*b* as a confirmation of beam pairing between the UE 315 and the secondary base station 310.

In some cases, the UE 315 may transmit an uplink message 380-*a* to the master base station 305. In some cases, the UE 315 may transmit an uplink message 380 to both the master base station 305 and the secondary base station 310.

At block 385, the secondary base station 310 may determine a timing alignment based on the uplink message 380-*b* received from the UE 315. The secondary base station 310 may infer the timing alignment from the uplink signal of the uplink message 380-*b* for each beam pair link. Using this timing alignment, the secondary base station 310 may perform beam pair link setup.

After performing the processes described above, the master base station 305, the secondary base station 310, the UE 315, or a combination thereof, may establish a beam pair link between the PSCell of the secondary base station 310 and the UE 315. Establishing the beam pair link may be based on the measure parameters of the downlink beams 370, the uplink message 380, timing alignment, or a combination thereof.

In some cases, the beam pairing procedures may be used in a carrier aggregation context. For example, a base station (e.g., master base station 305) may infer timing alignment in a carrier aggregation context based on an uplink message 380 received from the UE 315.

Figure 4:
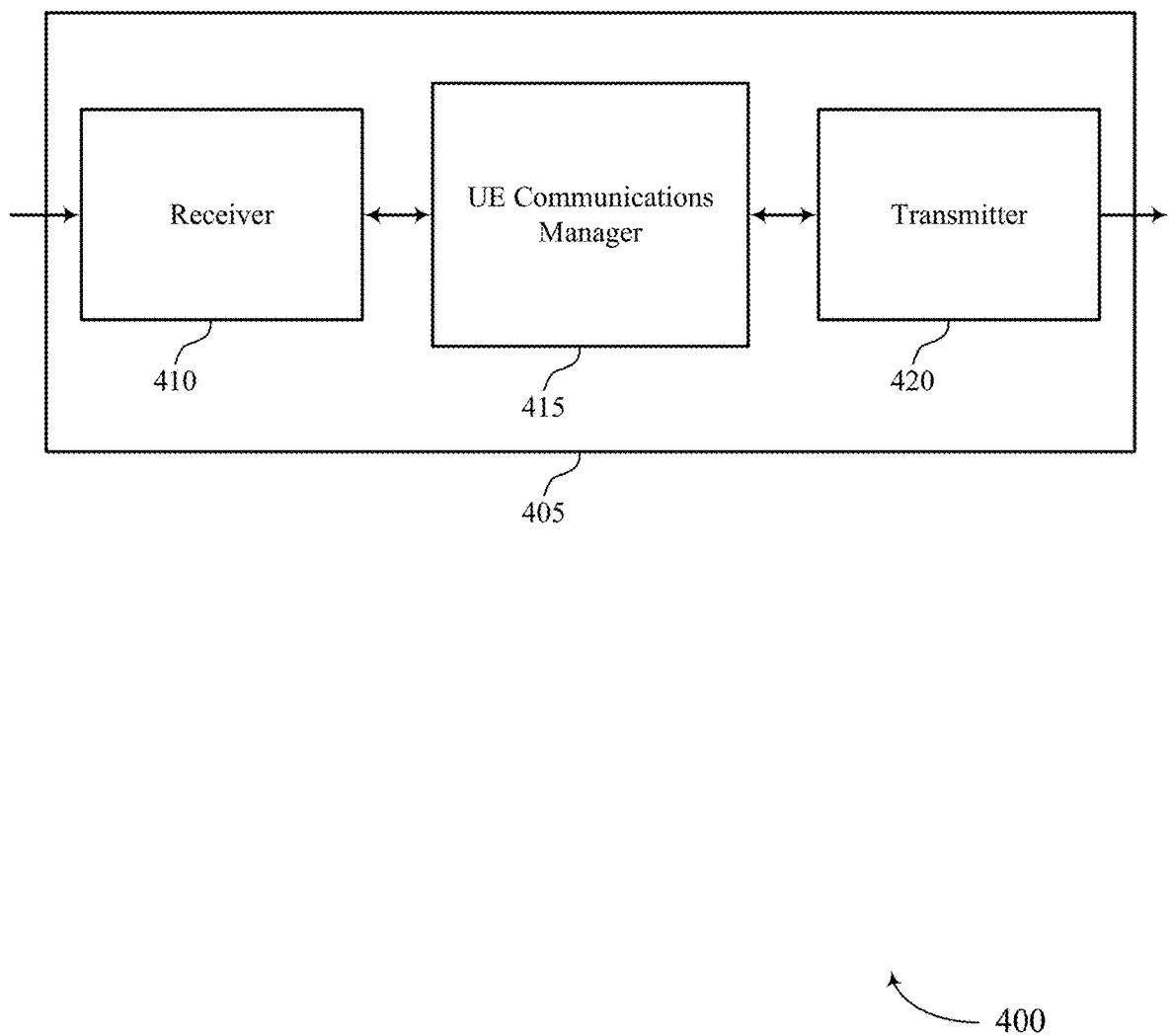
FIGS. 4 through 6 show block diagrams of a device that supports techniques for establishing a beam pair link in accordance with aspects of the present disclosure.

FIG. 4 shows a block diagram 400 of a wireless device 405 that supports techniques for establishing a beam pair link in accordance with aspects of the present disclosure. Wireless device 405 may be an example of aspects of a UE 115, 215, 315 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to techniques for establishing a beam pair link, etc.). Information may be passed on to other components of the device. The receiver 410 may be an example of aspects of the transceiver 735 described with reference to FIG. 7. The receiver 410 may utilize a single antenna or a set of antennas.

UE communications manager 415 may be an example of aspects of the UE communications manager 715 described with reference to FIG. 7. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may receive a first message from a first base station indicating a beam parameter of one or more beams to measure, transmit a measurement report that includes the beam parameter based on receiving the first message, receive a second message from the first base station indicating a time window for monitoring a downlink beam based on transmitting the measurement report, and monitor the downlink beam during the time window based on receiving the second message. The first message may be a measurement message and the terms first message and measurement message may be used interchangeably. Additionally, the second message may be a time window message and the terms time window message and second message may be used interchangeably.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
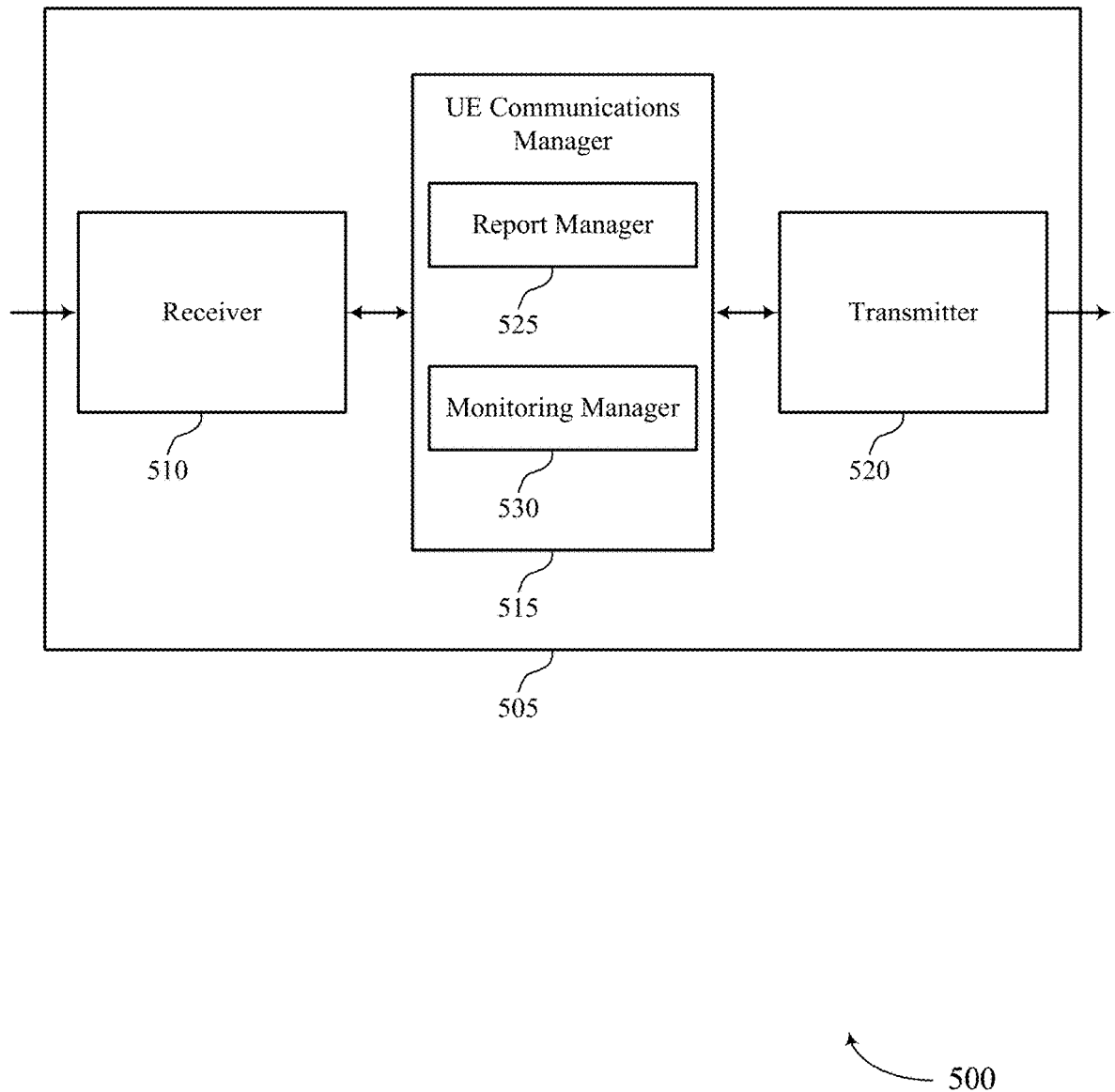

FIG. 5 shows a block diagram 500 of a wireless device 505 that supports techniques for establishing a beam pair link in accordance with aspects of the present disclosure. Wireless device 505 may be an example of aspects of a wireless device 405 or a UE 115, 215, 315 as described with reference to FIGS. 1-4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to techniques for establishing a beam pair link, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may also include report manager 525 and monitoring manager 530.

Report manager 525 may receive a first message from a first base station indicating a beam parameter of one or more beams to measure and transmit a measurement report that includes the beam parameter based on receiving the first message. In some cases, the first message indicates a second base station with which to establish a dual connectivity communication link and the one or more beams are associated with a second base station different from the first base station. In some cases, the one or more beams are synchronization signal beams associated with a second base station or CSI-RS beams associated with the second base station. In some cases, the measurement report includes a beam index, a RSRP measurement, a RSRQ measurement, a RSSI measurement, a SINR measurement, or a combination thereof. The first message may be a measurement message and the terms first message and measurement message may be used interchangeably.

Monitoring manager 530 may receive a second message from the first base station indicating a time window for monitoring a downlink beam based on transmitting the measurement report and monitor the downlink beam during the time window based on receiving the second message. In some cases, the downlink beam is a PDCCH beam. The second message may be a time window message and the terms time window message and second message may be used interchangeably.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
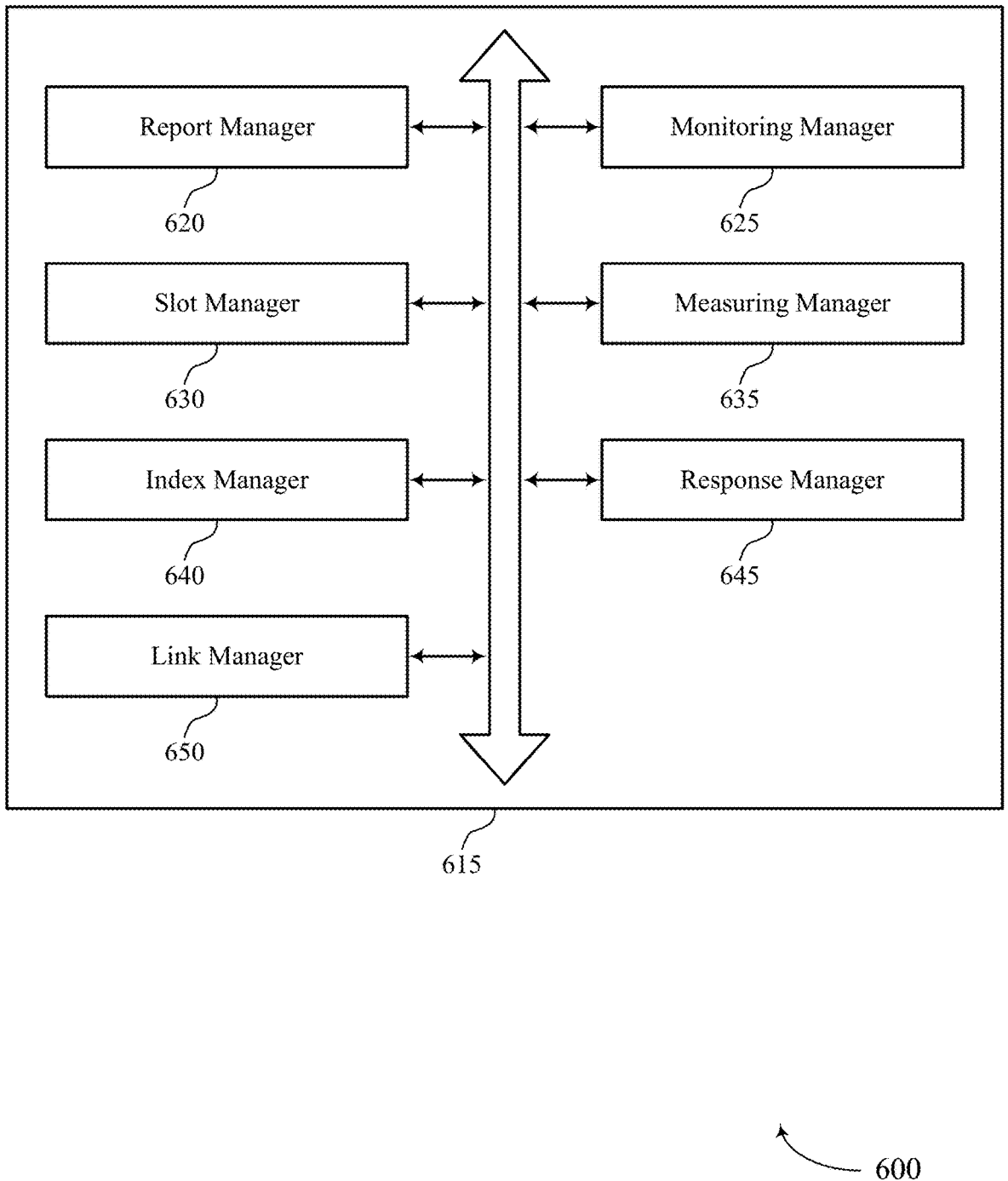

FIG. 6 shows a block diagram 600 of a UE communications manager 615 that supports techniques for establishing a beam pair link in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include report manager 620, monitoring manager 625, slot manager 630, measuring manager 635, index manager 640, response manager 645, and link manager 650. Each of these modules may communicate, directly or indirectly, with one another (e.g., via one or more buses).

Report manager 620 may receive a first message from a first base station indicating a beam parameter of one or more beams to measure and transmit a measurement report that includes the beam parameter based on receiving the first message. In some cases, the first message indicates a second base station with which to establish a dual connectivity communication link and the one or more beams are associated with a second base station different from the first base station. In some cases, the one or more beams are synchronization signal beams associated with a second base station or CSI-RS beams associated with the second base station. In some cases, the measurement report includes a beam index, a RSRP measurement, a RSRQ measurement, a RSSI measurement, a SINR measurement, or a combination thereof.

Monitoring manager 625 may receive a second message from the first base station indicating a time window for monitoring a downlink beam based on transmitting the measurement report and monitor the downlink beam during the time window based on receiving the second message. In some cases, the downlink beam is a PDCCH beam.

Slot manager 630 may identify one or more slots to monitor for the downlink beam using a reception beam corresponding to a synchronization signal block beam (for example, the same beam on which the synchronization signal block was received), based on receiving the second message, where monitoring the downlink beam is based on identifying the one or more slots.

Measuring manager 635 may measure the beam parameter of at least one beam based on receiving the first message, where transmitting the measurement report is based on measuring the beam parameter and measure the beam parameter for each of the one or more beams using a single reception beam based on receiving the first message.

Index manager 640 may identify a beam index of at least one beam of the one or more beams based on measuring the beam parameter for each of the one or more beams, where transmitting the measurement report is based on identifying the beam index.

Response manager 645 may transmit a third message using a transmission beam based on monitoring the downlink beam. In some cases, the third message is a RACH message, a SRS, or a scheduling request. Link manager 650 may establish a beam pair link based on monitoring the downlink beam.

Figure 7:
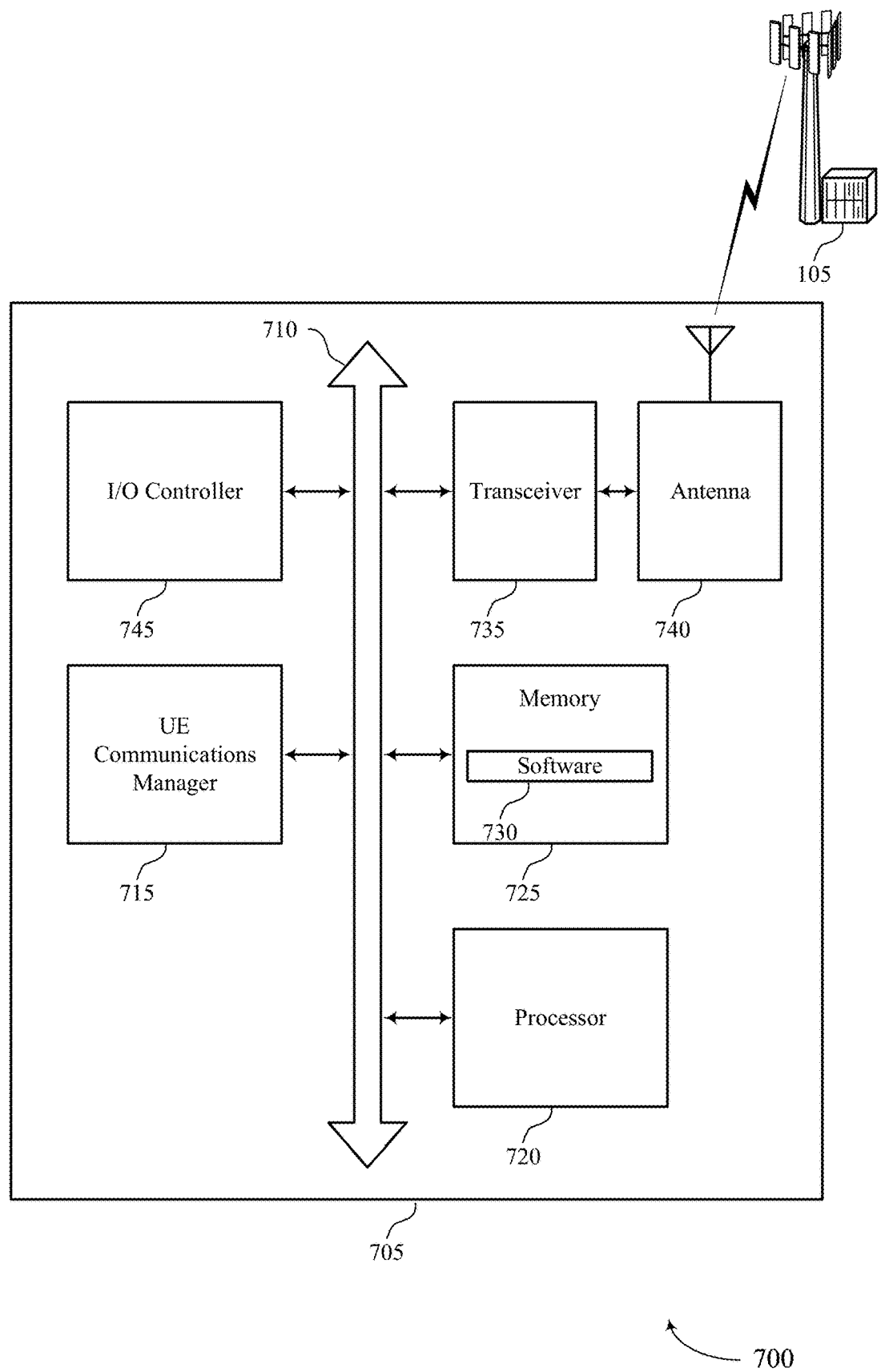
FIG. 7 illustrates a block diagram of a system including a UE that supports techniques for establishing a beam pair link in accordance with aspects of the present disclosure.

FIG. 7 shows a diagram of a system 700 including a device 705 that supports techniques for establishing a beam pair link in accordance with aspects of the present disclosure. Device 705 may be an example of or include the components of wireless device 405, wireless device 505, or a UE 115, 215, 315 as described above, e.g., with reference to FIGS. 1-5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting techniques for establishing a beam pair link).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support techniques for establishing a beam pair link. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
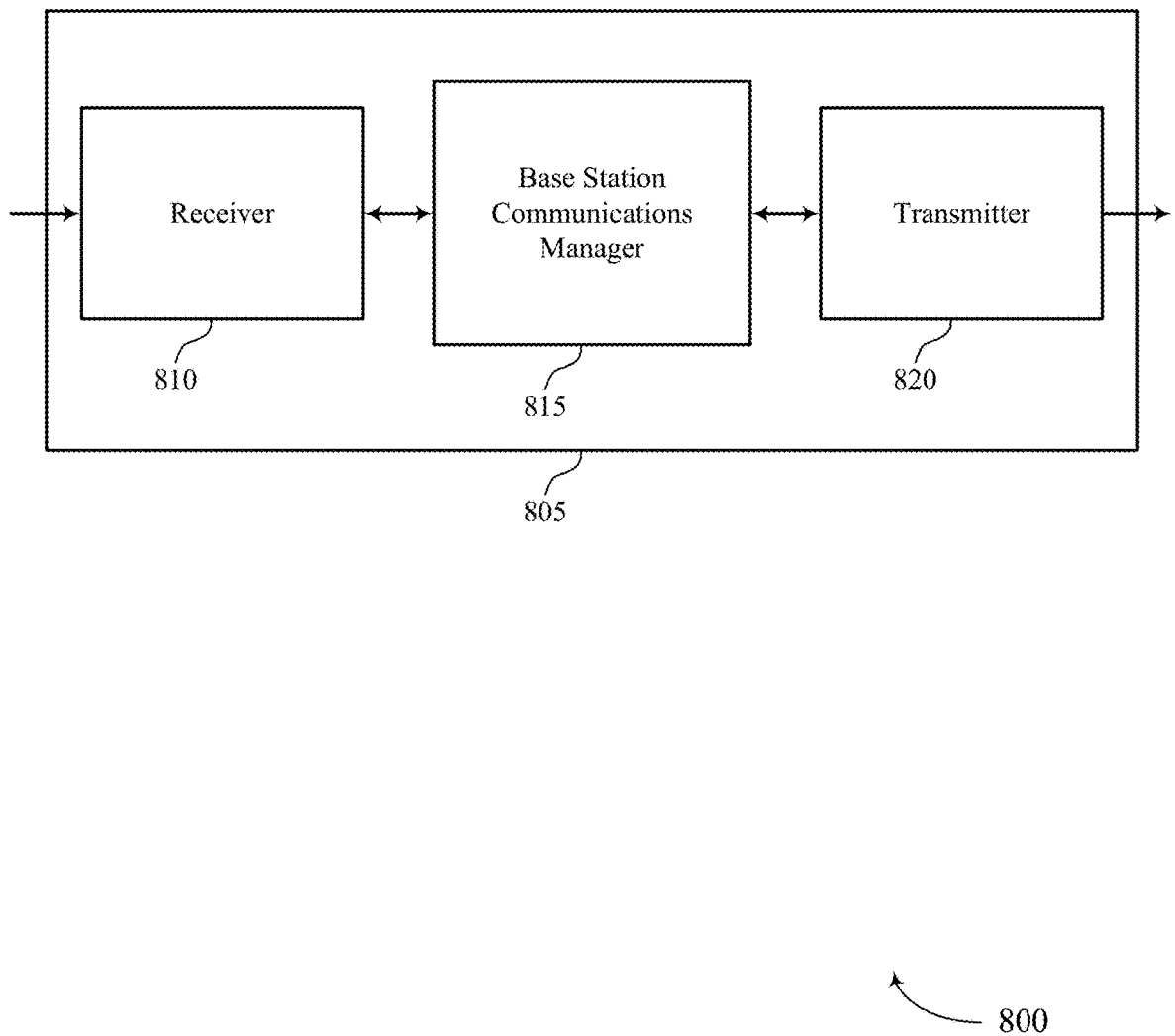
FIGS. 8 through 10 show block diagrams of a device that supports techniques for establishing a beam pair link in accordance with aspects of the present disclosure.

FIG. 8 shows a block diagram 800 of a wireless device 805 that supports techniques for establishing a beam pair link in accordance with aspects of the present disclosure. Wireless device 805 may be an example of aspects of a base station 105, 205, 210, 305, 310 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for establishing a beam pair link, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may transmit a first message to a UE indicating a beam parameter of one or more beams to measure, receive a measurement report that includes the beam parameter based on transmitting the first message, determine a time window for monitoring a downlink beam based on information included in the measurement report, and transmit a second message to the UE indicating the time window for monitoring the downlink beam. The base station communications manager 815 may also transmit a set of downlink beams in a set of directions, receive a message from a UE based on at least one of the transmitted downlink beams, determine a timing alignment with the UE based on receiving the message, and establish a beam pair link based on determining the timing alignment. The first message may be a measurement message and the terms first message and measurement message may be used interchangeably. Additionally, the second message may be a time window message and the terms time window message and second message may be used interchangeably.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
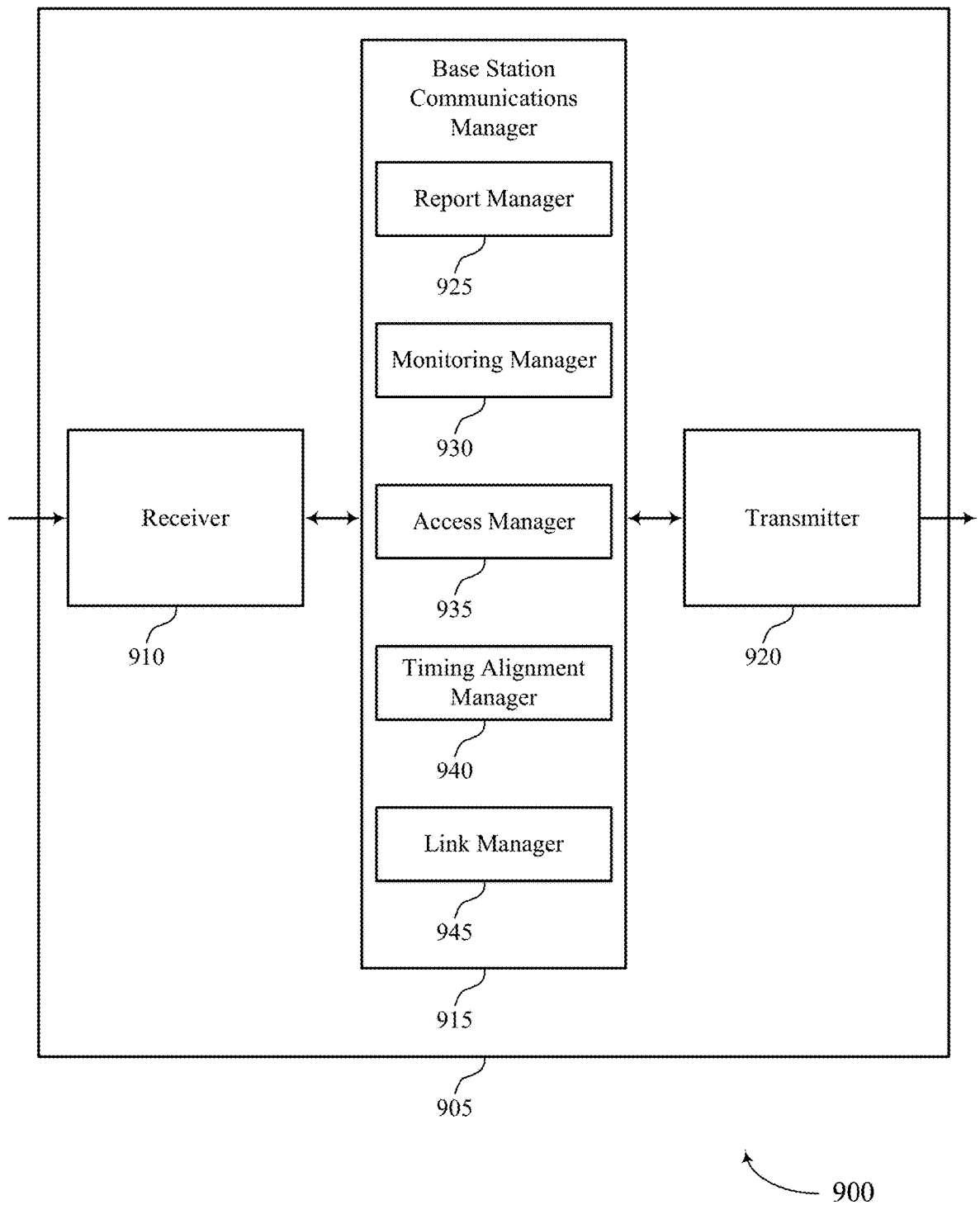

FIG. 9 shows a block diagram 900 of a wireless device 905 that supports techniques for establishing a beam pair link in accordance with aspects of the present disclosure. Wireless device 905 may be an example of aspects of a wireless device 805 or a base station 105, 205, 210, 305, 310 as described with reference to FIGS. 1-3 and 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for establishing a beam pair link, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 may also include report manager 925, monitoring manager 930, access manager 935, timing alignment manager 940, and link manager 945.

Report manager 925 may transmit a first message to a UE indicating a beam parameter of one or more beams to measure and receive a measurement report that includes the beam parameter based on transmitting the first message.

Monitoring manager 930 may determine a time window for monitoring a downlink beam based on information included in the measurement report and transmit a second message to the UE indicating the time window for monitoring the downlink beam.

Access manager 935 may transmit a set of downlink beams in a set of directions, receive a message from a UE based on at least one of the transmitted downlink beams, and transmit a set of synchronization signal beams, where receiving the message is based on transmitting the set of synchronization signal beams. In some cases, the message is a RACH message. In some cases, the message is a scheduling request (SR). Timing alignment manager 940 may determine a timing alignment with the UE based on receiving the message.

Link manager 945 may establish a beam pair link based on receiving the third message, identify a secondary base station with which the UE is to establish a dual connectivity communication link, where transmitting the first message is based on identifying the secondary base station, and establish a beam pair link based on determining the timing alignment. In some cases, the first message indicates a second base station with which to establish a dual connectivity communication link and the one or more beams are associated with a second base station different from the first base station. In some cases, the beam pair link is established as part of a dual connectivity procedure.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
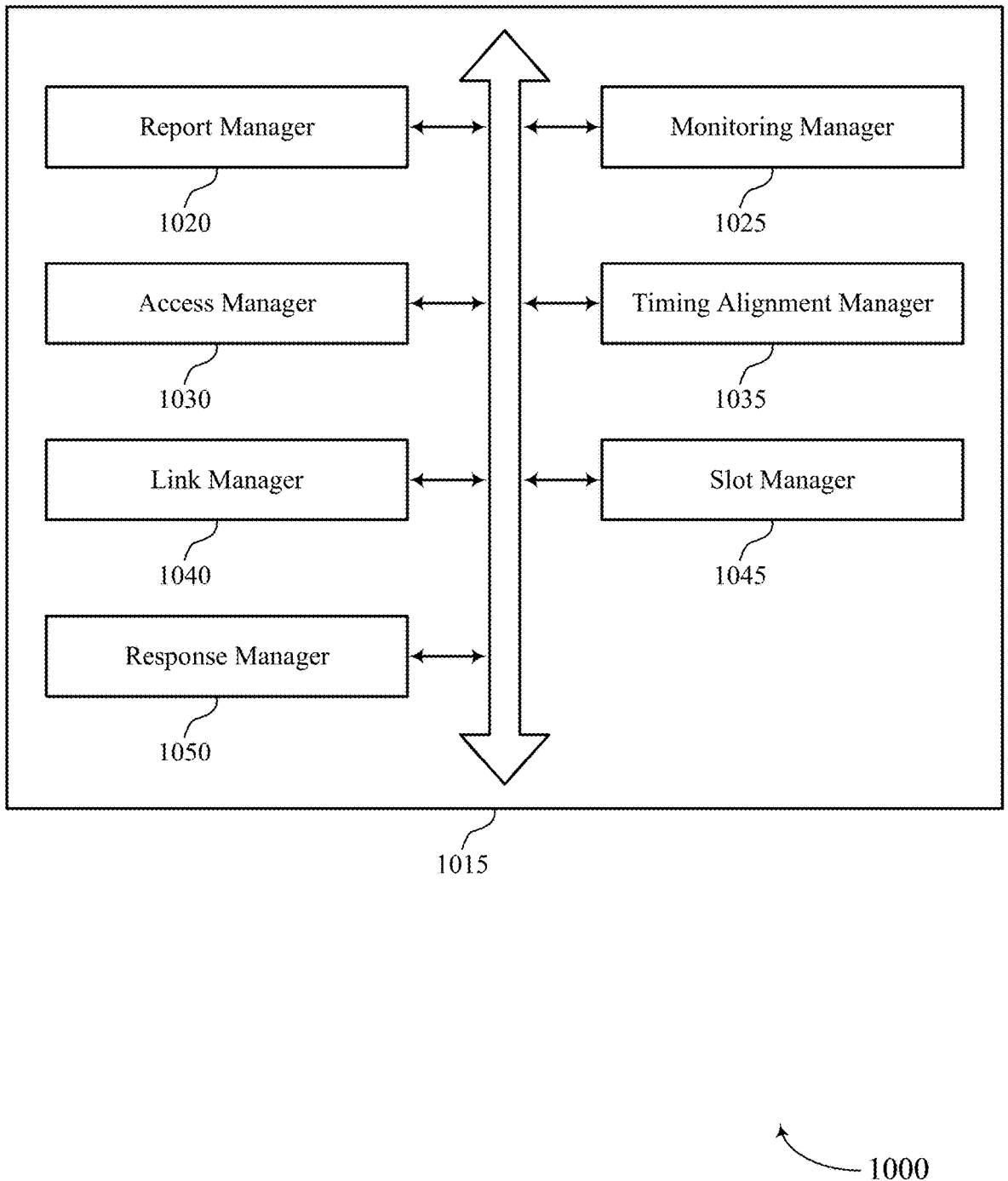

FIG. 10 shows a block diagram 1000 of a base station communications manager 1015 that supports techniques for establishing a beam pair link in accordance with aspects of the present disclosure. The base station communications manager 1015 may be an example of aspects of a base station communications manager 1115 described with reference to FIGS. 8, 9, and 11. The base station communications manager 1015 may include report manager 1020, monitoring manager 1025, access manager 1030, timing alignment manager 1035, link manager 1040, slot manager 1045, and response manager 1050. Each of these modules may communicate, directly or indirectly, with one another (e.g., via one or more buses).

Report manager 1020 may transmit a first message to a UE indicating a beam parameter of one or more beams to measure and receive a measurement report that includes the beam parameter based on transmitting the first message.

Monitoring manager 1025 may determine a time window for monitoring a downlink beam based on information included in the measurement report and transmit a second message to the UE indicating the time window for monitoring the downlink beam.

Access manager 1030 may transmit a set of downlink beams in a set of directions, receive an uplink message from a UE based on at least one of the transmitted downlink beams, and transmit a set of synchronization signal beams, where receiving the message is based on transmitting the set of synchronization signal beams. In some cases, the message is a RACH message. In some cases, the message is a scheduling request (SR). Timing alignment manager 1035 may determine a timing alignment with the UE based on receiving the message.

Link manager 1040 may establish a beam pair link based on receiving the third message, identify a secondary base station with which the UE is to establish a dual connectivity communication link, where transmitting the first message is based on identifying the secondary base station, and establish a beam pair link based on determining the timing alignment. In some cases, the first message indicates a second base station with which to establish a dual connectivity communication link and the one or more beams are associated with a second base station different from the first base station. In some cases, the beam pair link is established as part of a dual connectivity procedure. The first message may be a measurement message and the terms first message and measurement message may be used interchangeably.

Slot manager 1045 may identify one or more slots for the UE to monitor, based on receiving the measurement report, for the downlink beam using a reception beam corresponding to a synchronization signal block beam (for example, the same beam on which the synchronization signal block was received), where the second message includes information indicating the one or more slots. Response manager 1050 may receive a third message from the UE based on transmitting the second message.

Figure 11:
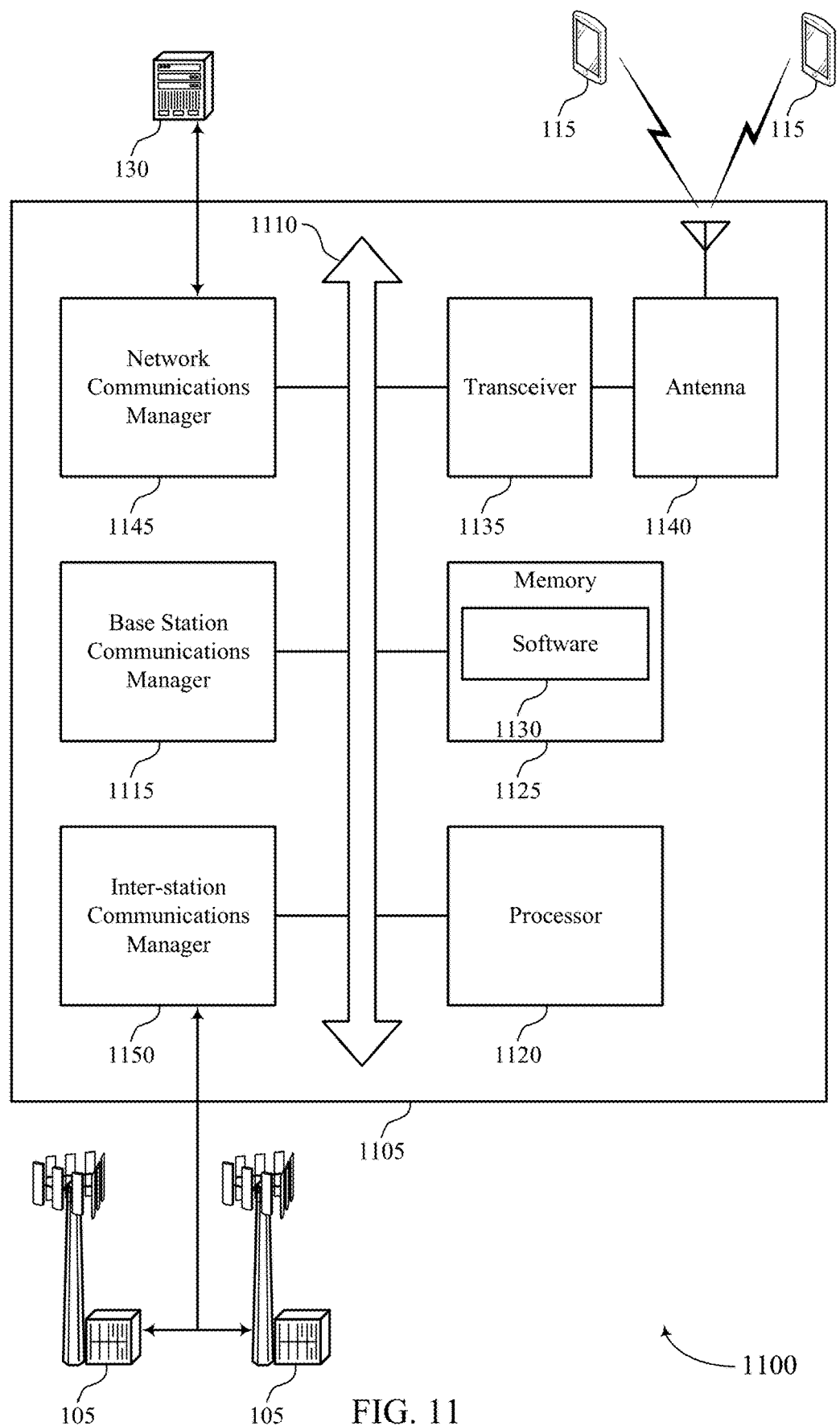
FIG. 11 illustrates a block diagram of a system including a base station that supports techniques for establishing a beam pair link in accordance with aspects of the present disclosure.

FIG. 11 shows a diagram of a system 1100 including a device 1105 that supports techniques for establishing a beam pair link in accordance with aspects of the present disclosure. Device 1105 may be an example of or include the components of base station 105, 205, 210, 305, 310 as described above, e.g., with reference to FIGS. 1-3. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for establishing a beam pair link).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support techniques for establishing a beam pair link. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an Long Term Evolution (LTE)/LTE-A wireless communication network technology to provide communication between base stations 105.

Figure 12:
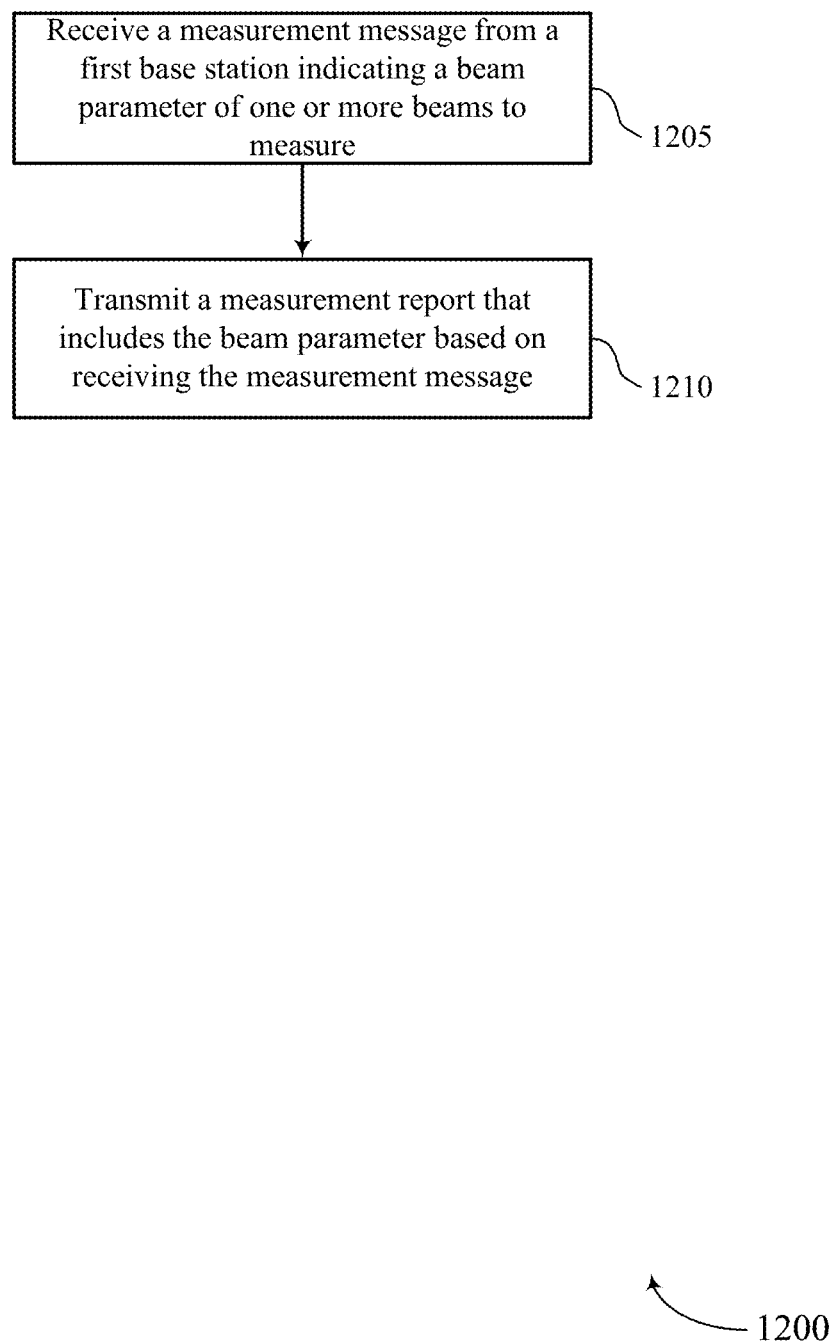
FIGS. 12 through 15 illustrate methods for techniques for establishing a beam pair link in accordance with aspects of the present disclosure.

FIG. 12 shows a flowchart illustrating a method 1200 for techniques for establishing a beam pair link in accordance with aspects of the present disclosure. The operations of method 1200 may be implemented by a UE 115, 215, 315 or its components as described herein. For example, the operations of method 1200 may be performed by a UE communications manager as described with reference to FIGS. 4 through 7. In some examples, a UE 115, 215, 315 may execute a set of codes to control the functional elements of the device to perform the functions described below. Additionally or alternatively, the UE 115 may perform aspects of the functions described below using special-purpose hardware.

At block 1205 the UE 315 may receive a first message from a first base station indicating a beam parameter of one or more beams to measure. The operations of block 1205 may be performed according to the methods described herein. In certain examples, aspects of the operations of block 1205 may be performed by a report manager as described with reference to FIGS. 4 through 7. The first message may be a measurement message and the terms first message and measurement message may be used interchangeably.

At block 1210 the UE 315 may transmit a measurement report that includes the beam parameter based at least in part on receiving the first message. The operations of block 1210 may be performed according to the methods described herein. In certain examples, aspects of the operations of block 1210 may be performed by a report manager as described with reference to FIGS. 4 through 7.

Figure 13:
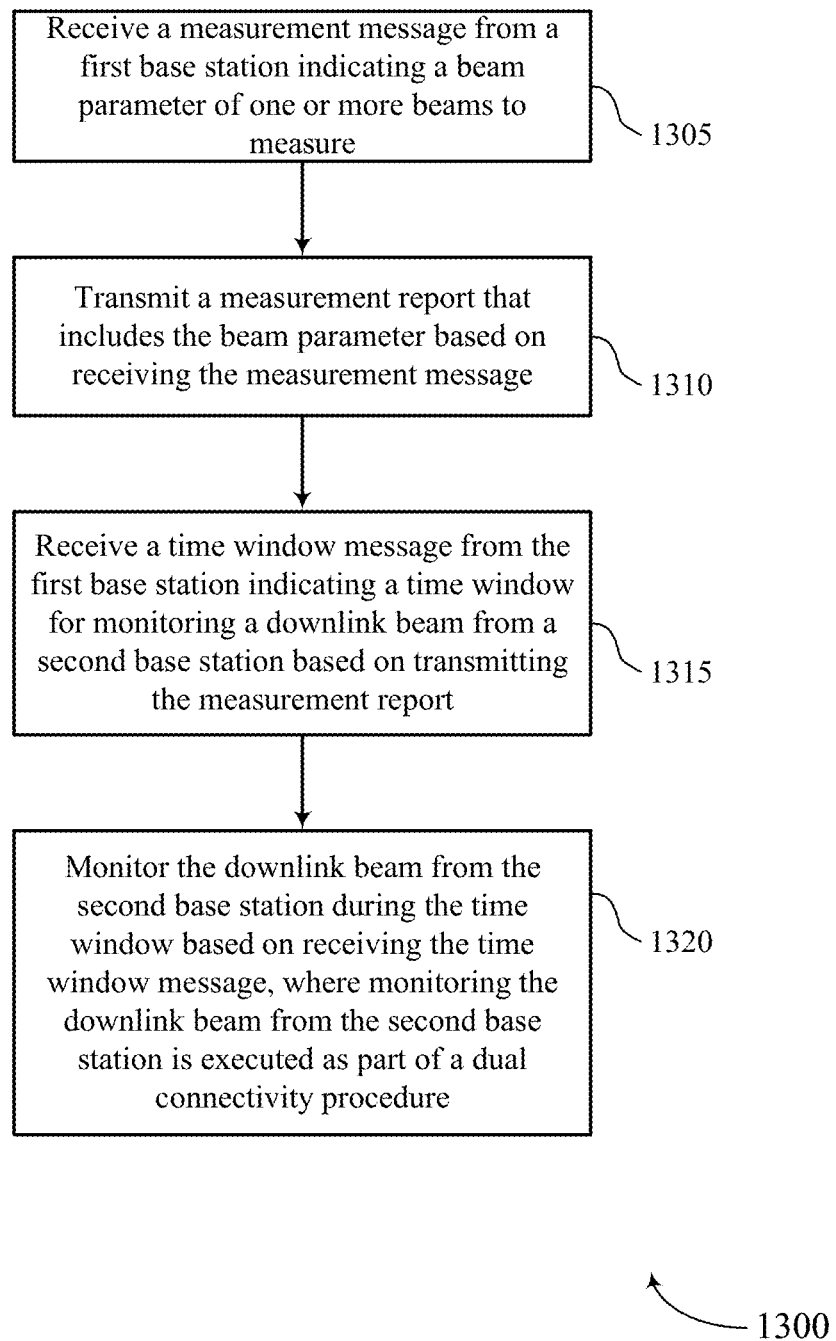

FIG. 13 shows a flowchart illustrating a method 1300 for techniques for establishing a beam pair link in accordance with aspects of the present disclosure. The operations of method 1300 may be implemented by a UE 115, 215, 315 or its components as described herein. For example, the operations of method 1300 may be performed by a UE communications manager as described with reference to FIGS. 4 through 7. In some examples, a UE 115, 215, 315 may execute a set of codes to control the functional elements of the device to perform the functions described below. Additionally or alternatively, the UE 115 may perform aspects of the functions described below using special-purpose hardware.

At block 1305 the UE 315 may receive a first message from a first base station indicating a beam parameter of one or more beams to measure. The operations of block 1305 may be performed according to the methods described herein. In certain examples, aspects of the operations of block 1305 may be performed by a report manager as described with reference to FIGS. 4 through 7. The first message may be a measurement message and the terms first message and measurement message may be used interchangeably.

At block 1310 the UE 315 may transmit a measurement report that includes the beam parameter based at least in part on receiving the first message, where receiving the time window message is based at least in part on transmission of the measurement report. The operations of block 1310 may be performed according to the methods described herein. In certain examples, aspects of the operations of block 1310 may be performed by a report manager as described with reference to FIGS. 4 through 7.

At block 1315 the UE 315 may receive a second message from the first base station indicating a time window for monitoring a downlink beam. The operations of block 1315 may be performed according to the methods described herein. In certain examples, aspects of the operations of block 1315 may be performed by a monitoring manager as described with reference to FIGS. 4 through 7. The second message may be a time window message and the terms time window message and second message may be used interchangeably.

At block 1320 the UE 315 may monitor the downlink beam during the time window based at least in part on receiving the second message. The operations of block 1320 may be performed according to the methods described herein. In certain examples, aspects of the operations of block 1320 may be performed by a monitoring manager as described with reference to FIGS. 4 through 7.

Figure 14:
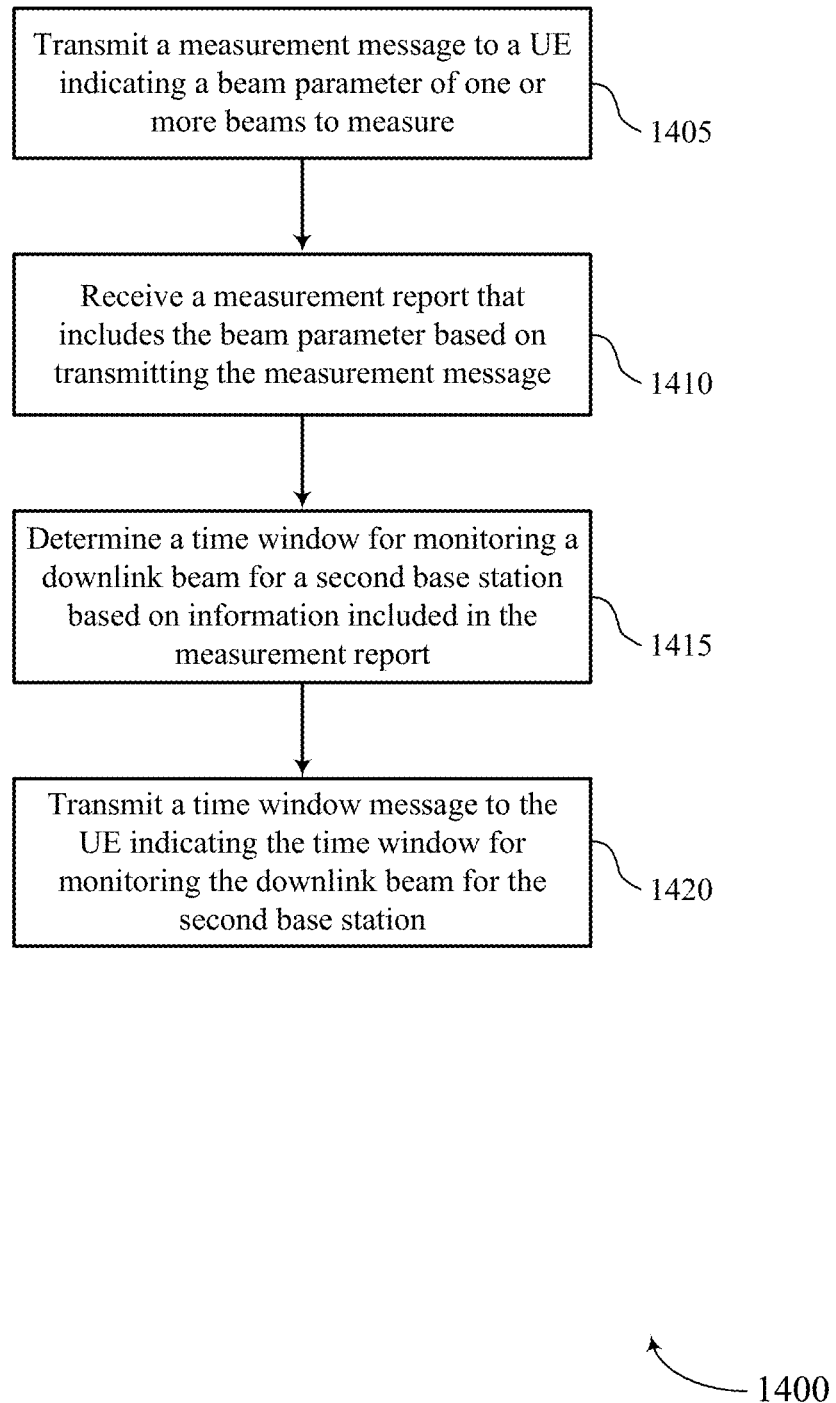

FIG. 14 shows a flowchart illustrating a method 1400 for techniques for establishing a beam pair link in accordance with aspects of the present disclosure. The operations of method 1400 may be implemented by a base station 105, 205, 210, 305, 310 or its components as described herein. For example, the operations of method 1400 may be performed by a base station communications manager as described with reference to FIGS. 8 through 11. In some examples, a base station 105, 205, 210, 305, 310 may execute a set of codes to control the functional elements of the device to perform the functions described below. Additionally or alternatively, the base station 105, 205, 210, 305, 310 may perform aspects of the functions described below using special-purpose hardware.

At block 1405 the master base station 305 may transmit a first message to a UE indicating a beam parameter of one or more beams to measure. The operations of block 1405 may be performed according to the methods described herein. In certain examples, aspects of the operations of block 1405 may be performed by a report manager as described with reference to FIGS. 8 through 11.

At block 1410 the master base station 305 may receive a measurement report that includes the beam parameter based at least in part on transmitting the first message. The operations of block 1410 may be performed according to the methods described herein. In certain examples, aspects of the operations of block 1410 may be performed by a report manager as described with reference to FIGS. 8 through 11.

At block 1415 the master base station 305 may determine a time window for monitoring a downlink beam based at least in part on information included in the measurement report. The operations of block 1415 may be performed according to the methods described herein. In certain examples, aspects of the operations of block 1415 may be performed by a monitoring manager as described with reference to FIGS. 8 through 11.

At block 1420 the master base station 305 may transmit a second message to the UE indicating the time window for monitoring the downlink beam. The operations of block 1420 may be performed according to the methods described herein. In certain examples, aspects of the operations of block 1420 may be performed by a monitoring manager as described with reference to FIGS. 8 through 11.

Figure 15:
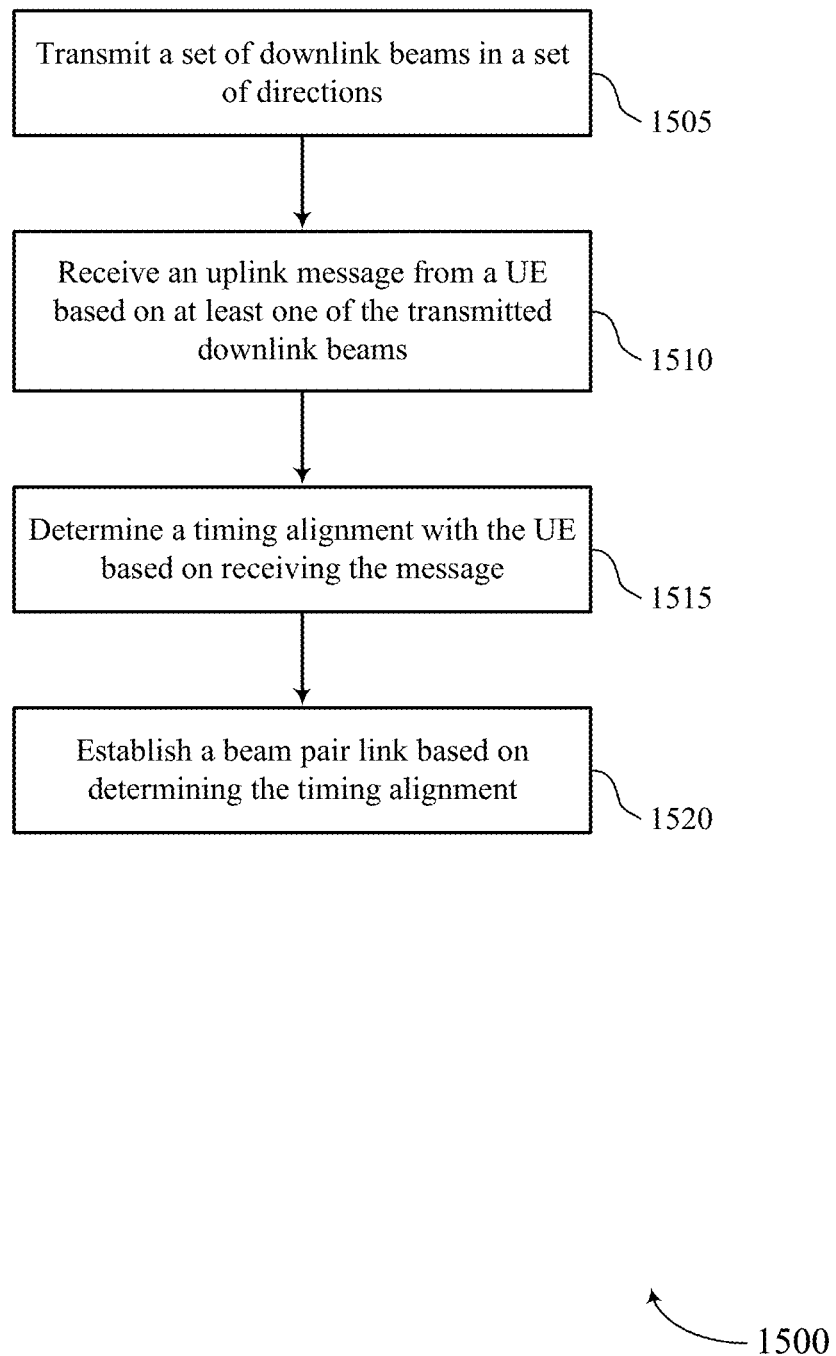

FIG. 15 shows a flowchart illustrating a method 1500 for techniques for establishing a beam pair link in accordance with aspects of the present disclosure. The operations of method 1500 may be implemented by a base station 105, 205, 210, 305, 310 or its components as described herein. For example, the operations of method 1500 may be performed by a base station communications manager as described with reference to FIGS. 8 through 11. In some examples, a base station 105, 205, 210, 305, 310 may execute a set of codes to control the functional elements of the device to perform the functions described below. Additionally or alternatively, the base station 105, 205, 210, 305, 310 may perform aspects of the functions described below using special-purpose hardware.

At block 1505 the secondary base station 310 may transmit a plurality of downlink beams in a plurality of directions. The operations of block 1505 may be performed according to the methods described herein. In certain examples, aspects of the operations of block 1505 may be performed by a access manager as described with reference to FIGS. 8 through 11.

At block 1510 the secondary base station 310 may receive a message from a UE based at least in part on at least one of the transmitted downlink beams. The operations of block 1510 may be performed according to the methods described herein. In certain examples, aspects of the operations of block 1510 may be performed by a access manager as described with reference to FIGS. 8 through 11.

At block 1515 the secondary base station 310 may determine a timing alignment with the UE based on receiving the message. The operations of block 1515 may be performed according to the methods described herein. In certain examples, aspects of the operations of block 1515 may be performed by a timing alignment manager as described with reference to FIGS. 8 through 11.

At block 1520 the secondary base station 310 may establish a beam pair link based at least in part on determining the timing alignment. The operations of block 1520 may be performed according to the methods described herein. In certain examples, aspects of the operations of block 1520 may be performed by a link manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
performing, by a user equipment (UE), a measurement of a beam parameter of one or more beams transmitted by a second base station;
transmitting, to a first base station, a measurement report indicating the measurement of the beam parameter;
receiving, by the UE in response to transmitting the measurement report to the first base station, a time window message from the first base station indicating a time window for monitoring a downlink beam from the second base station, wherein the time window is based at least in part on the measurement by the UE of the beam parameter of the one or more beams transmitted by the second base station; and
monitoring the downlink beam from the second base station during the time window based at least in part on receiving the time window message, wherein monitoring the downlink beam from the second base station is executed as part of a dual connectivity procedure.

2. The method of claim 1, wherein the first base station is a master base station and the second base station is a secondary base station in the dual connectivity procedure.

3. The method of claim 1, further comprising:
receiving a measurement message from the first base station indicating the beam parameter of the one or more beams to measure; and
transmitting the measurement report that includes the beam parameter based at least in part on receiving the measurement message, wherein receiving the time window message is based at least in part on transmission of the measurement report.

4. The method of claim 3, further comprising:
establishing a beam pair link based at least in part on monitoring the downlink beam.

5. The method of claim 3, further comprising:
identifying, based at least in part on receiving the time window message, one or more slots to monitor for the downlink beam using a reception beam on which a synchronization signal block was received, wherein monitoring the downlink beam is based at least in part on identifying the one or more slots.

6. The method of claim 3, further comprising:
measuring the beam parameter of the one or more beams based at least in part on receiving the measurement message, wherein transmitting the measurement report is based at least in part on measuring the beam parameter.

7. The method of claim 3, further comprising:
measuring the beam parameter for each of the one or more beams using a single reception beam based at least in part on receiving the measurement message; and
identifying a beam index of at least one beam of the one or more beams based at least in part on measuring the beam parameter for each of the one or more beams, wherein transmitting the measurement report is based at least in part on identifying the beam index.

8. The method of claim 3, further comprising:
transmitting a third message using a transmission beam that is determined, based at least in part on monitoring the downlink beam.

9. The method of claim 8, wherein:
the third message is a random access channel (RACH) message, a sounding reference signal (SRS), or a scheduling request (SR).

10. The method of claim 3, wherein:
the measurement message indicates the second base station with which to establish a dual connectivity communication link and the one or more beams are associated with the second base station different from the first base station.

11. The method of claim 3, wherein:
the one or more beams are synchronization signal beams associated with the second base station or channel state information reference signal (CSI-RS) beams associated with the second base station.

12. The method of claim 3, wherein:
the downlink beam is a physical downlink control channel (PDCCH) beam.

13. The method of claim 12, wherein an UL transmission of the second base station is based on the downlink beam.

14. The method of claim 3, wherein:
the measurement report includes a beam index, a received signal received power (RSRP) measurement, a received signal received quality (RSRQ) measurement, a received signal strength indicator (RSSI) measurement, a signal-to-interference-plus-noise ratio (SINR) measurement, or a combination thereof.

15. An apparatus for wireless communication, comprising:
a processor;
memory coupled with the processor; and
instructions stored in the memory and operable, when executed by the processor, to cause the apparatus to:
perform, by a user equipment (UE), a measurement of a beam parameter of one or more beams transmitted by a second base station;
transmit, to a first base station, a measurement report indicating the measurement of the beam parameter;
receive, by the UE in response to transmission of the measurement report to the first base station, a time window message from the first base station indicating a time window for monitoring a downlink beam from the second base station, wherein the time window is based at least in part on the measurement by the UE of the beam parameter of the one or more beams transmitted by the second base station; and
monitor the downlink beam from the second base station during the time window based at least in part on receiving the time window message, wherein monitoring the downlink beam from the second base station is executed as part of a dual connectivity procedure.

16. The apparatus of claim 15, wherein the instructions are further executable by the processor to:
receive a measurement message from the first base station indicating the beam parameter of the one or more beams to measure; and
transmit the measurement report that includes the beam parameter based at least in part on receiving the measurement message, wherein receiving the time window message is based at least in part on transmission of the measurement report.

17. The apparatus of claim 16, wherein the instructions are further executable by the processor to:
establish a beam pair link based at least in part on monitoring the downlink beam.

18. The apparatus of claim 16, wherein the instructions are further executable by the processor to:
identify, based at least in part on receiving the time window message, one or more slots to monitor for the downlink beam using a reception beam on which a synchronization signal block was received, wherein monitoring the downlink beam is based at least in part on identifying the one or more slots.

19. The apparatus of claim 16, wherein the instructions are further executable by the processor to:
measure the beam parameter of the one or more beams based at least in part on receiving the measurement message, wherein transmitting the measurement report is based at least in part on measuring the beam parameter.

20. The apparatus of claim 16, wherein the instructions are further executable by the processor to:
measure the beam parameter for each of the one or more beams using a single reception beam based at least in part on receiving the measurement message; and
identify a beam index of at least one beam of the one or more beams based at least in part on measuring the beam parameter for each of the one or more beams, wherein transmitting the measurement report is based at least in part on identifying the beam index.

21. The apparatus of claim 16, wherein the instructions are further executable by the processor to:
transmit a third message using a transmission beam that is determined, based at least in part on monitoring the downlink beam.

22. The apparatus of claim 16, wherein:
the measurement message indicates the second base station with which to establish a dual connectivity communication link and the one or more beams are associated with the second base station different from the first base station.

23. The apparatus of claim 16, wherein:
the one or more beams are synchronization signal beams associated with the second base station or channel state information reference signal (CSI-RS) beams associated with the second base station.

24. The apparatus of claim 16, wherein:
the downlink beam is a physical downlink control channel (PDCCH) beam.

* * * * *